(12) United States Patent
LaMantia et al.

(10) Patent No.: US 11,185,081 B2
(45) Date of Patent: Nov. 30, 2021

(54) ICING MACHINE AND ICING METHOD

(71) Applicant: Axis Automation, Hartland, WI (US)

(72) Inventors: Michael LaMantia, Volo, IL (US); Tigran K. Sarajian, Oconomowoc, WI (US)

(73) Assignee: Axis Automation, Hartland, WI (US)

( * ) Notice: Subject to any disclaimer, the term of this patent is extended or adjusted under 35 U.S.C. 154(b) by 28 days.

(21) Appl. No.: 16/601,052

(22) Filed: Oct. 14, 2019

(65) Prior Publication Data
US 2020/0037620 A1 Feb. 6, 2020

Related U.S. Application Data

(63) Continuation of application No. 15/612,635, filed on Jun. 2, 2017, now Pat. No. 10,477,868, which is a continuation of application No. PCT/US2015/065221, filed on Dec. 11, 2015.

(60) Provisional application No. 62/092,020, filed on Dec. 15, 2014.

(51) Int. Cl.
| | |
|---|---|
| *A23P 20/10* | (2016.01) |
| *A23P 20/15* | (2016.01) |
| *A21C 15/00* | (2006.01) |
| *A21D 13/24* | (2017.01) |
| *A21D 13/60* | (2017.01) |
| *A21C 9/04* | (2006.01) |
| *A23G 3/22* | (2006.01) |
| *B65H 15/00* | (2006.01) |
| *A23G 3/34* | (2006.01) |

(52) U.S. Cl.
CPC ............ *A21C 15/002* (2013.01); *A21D 13/24* (2017.01); *A21D 13/60* (2017.01); *A23P 20/10* (2016.08); *A23P 20/15* (2016.08); *A21C 9/04* (2013.01); *A23G 3/0085* (2013.01); *A23G 3/22* (2013.01); *B65H 15/00* (2013.01)

(58) Field of Classification Search
CPC ... A23G 3/22; A23G 3/24; A23P 20/17; A23P 20/15; A21C 15/002
See application file for complete search history.

(56) References Cited

U.S. PATENT DOCUMENTS

| | | | | |
|---|---|---|---|---|
| 1,957,961 | A * | 5/1934 | Hunter ................. | A21C 15/002 118/20 |
| 2,348,800 | A * | 5/1944 | Fredrickson ......... | A21C 15/002 118/13 |
| 2,525,306 | A * | 10/1950 | Lunsford ............. | A21C 15/002 118/24 |
| 3,536,034 | A * | 10/1970 | Lecrone ............... | A21C 15/002 118/16 |
| 4,622,891 | A * | 11/1986 | Cramer ................ | A21C 15/002 99/450.4 |

(Continued)

OTHER PUBLICATIONS

International Search Report and Written Opinion for PCT/US2015/065221, dated Mar. 21, 2016, 15 pages.

*Primary Examiner* — Binu Thomas
(74) *Attorney, Agent, or Firm* — Reinhart Boerner Van Deuren s.c.

(57) ABSTRACT

A system for the automated coating of baked good with a water based icing is provided. In particular, a system for the automated movement of icing and controls of variables such as temperature, moisture, and/or flow rate of the icing is provided to maintain the characteristics of the icing for extended periods of operation of an associated coating system.

8 Claims, 14 Drawing Sheets

(56) References Cited

U.S. PATENT DOCUMENTS

| | | | |
|---|---|---|---|
| 5,954,876 A * | 9/1999 | Koch | A23G 3/22 |
| | | | 118/13 |
| 7,841,294 B2 | 11/2010 | Meier et al. | |
| 2004/0000269 A1 * | 1/2004 | Herman | A21C 15/002 |
| | | | 118/14 |
| 2007/0116842 A1 | 5/2007 | Visona | |
| 2008/0187637 A1 * | 8/2008 | Spiegel | A21C 15/002 |
| | | | 426/383 |
| 2012/0067276 A1 * | 3/2012 | Schumann | A21C 15/002 |
| | | | 118/17 |

* cited by examiner

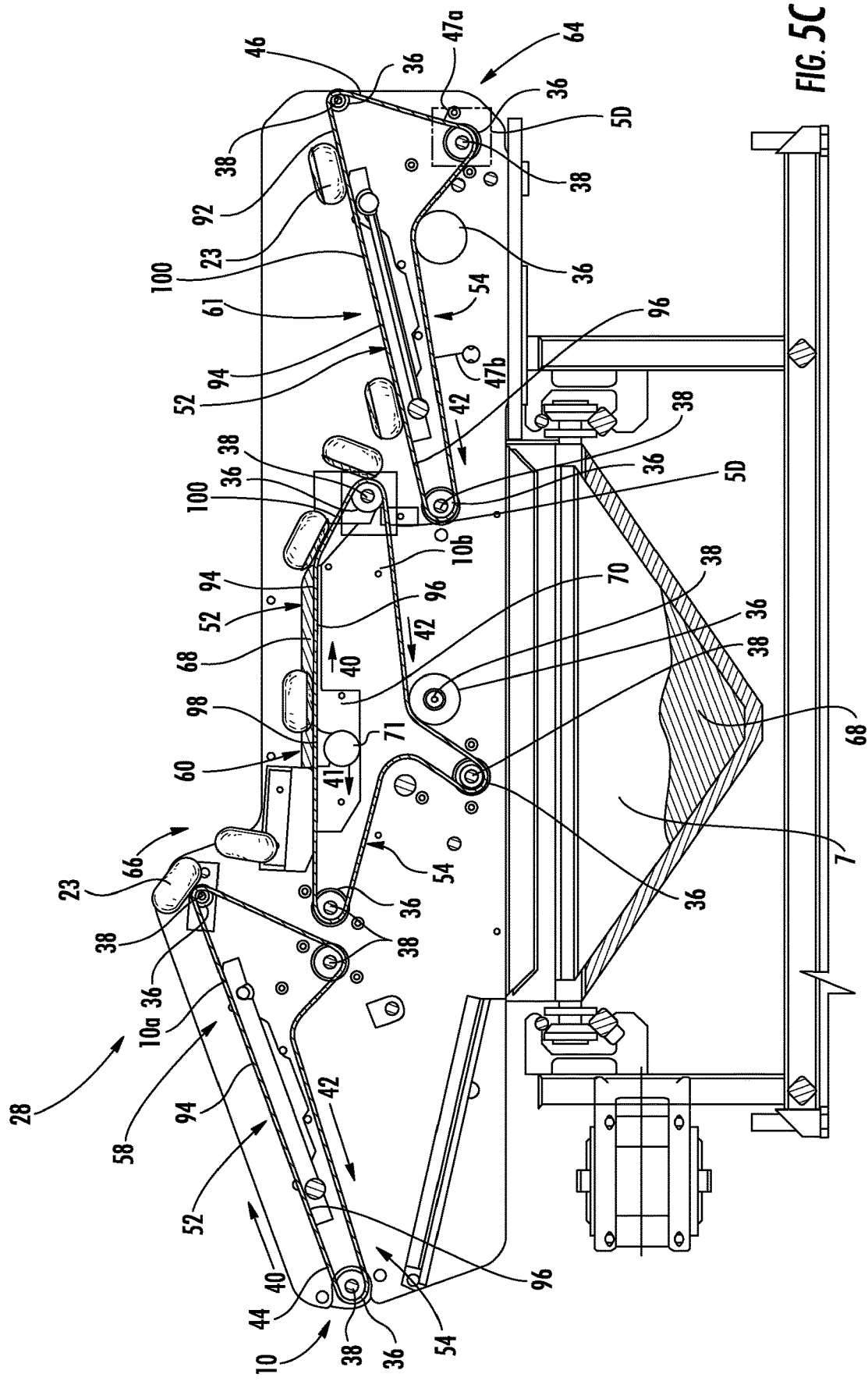

ICING MACHINE AND ICING METHOD

CROSS-REFERENCE TO RELATED PATENT APPLICATIONS

This application is a continuation of U.S. Non-Provisional application Ser. No. 15/612,635, filed Jun. 2, 2017, which is a continuation of International Application No. PCT/US2015/065221, filed Dec. 11, 2015, which claims the benefit of U.S. Provisional Patent Application No. 62/092,020, filed Dec. 15, 2014, which are incorporated herein by reference in their entireties.

BACKGROUND OF THE INVENTION

The present invention relates to the automated coating of bakery with an icing such as a water based icing. In particular, the present invention relates to the automated movement of icing which controls variables such as temperature, moisture, and/or flow rate of the icing alone or in combination to maintain the characteristics of the icing for extended periods of operation of an associated coating system.

SUMMARY OF THE INVENTION

One embodiment relates to an icing coating system. The icing coating system includes a temperature regulated return hopper, a belt, a belt sprocket assembly, a belt support arrangement, a variable speed drive, a pan, a variable-flow rate icing pump, a structure and a catch basin. The temperature regulated icing return hopper includes walls defining a reservoir for containing an icing and a heat exchanger in thermal communication with the reservoir wall. The belt conveys a food product to be coated with icing, the belt includes openings through which icing can flow. The belt sprocket assembly and the belt support arrangement movably support the belt such that a top portion of the belt moves between the belt sprocket and the belt support in a direction and a bottom portion of the belt moves between the belt sprocket and the belt support in a direction opposite to the top portion, the top portion of the belt including a top surface and a bottom surface. The variable speed drive is coupled to the belt sprocket arrangement to move the belt at a selectable speed. The pan is located between the top portion of the belt and the bottom portion of the belt. The variable-flow rate icing pump is in fluid communication between the reservoir and the pan to pump icing from the reservoir to the pan. The structure supports the belt sprocket assembly and the belt support arrangement and the icing pan such that the pan is located between the top and bottom portions of the belt and the bottom surface of the top portion of the belt is further supported by the pan through the openings of the belt and above the top surface of a belt such that at least a portion of food items located on the belt are resting within and coated with icing. The catch basin below the structure for receiving excessing icing from the pan.

Another embodiment relates to a coating system usable for coating bakery such as donuts and cookies. The system includes a temperature regulated icing return hopper, a belt, a belt sprocket assembly, a belt support arrangement, a variable speed drive, a pan, a variable-flow rate icing pump, a structure and a water induction system. The temperature regulated icing return hopper includes walls defining a reservoir for containing the icing and a heat exchanger in thermal communication with the reservoir walls, wherein the hopper includes a fluid jacket through which fluid at a predetermined temperature flows to regulate the temperature of the icing to reduce evaporation of moisture from the icing. The belt conveys bakery to be coated with icing, the belt includes openings through which icing can flow. The belt sprocket assembly and the belt support arrangement movably support the belt such that a top portion of the belt moves between the belt sprocket and the belt support in a direction and a bottom portion of the belt moves between the belt sprocket and the belt support in a direction opposite to the top portion, the top portion of the belt includes a top surface and a bottom surface. The variable speed drive is coupled to the belt sprocket arrangement to move the belt at a selectable speed. The pan is located between the top portion of the belt and the bottom portion of the belt. The variable-flow rate icing pump is in fluid communication between a catch basin and the pan to pump icing from the reservoir to the pan. The structure supports the belt sprocket assembly and the belt support arrangement and the icing pan such that the icing pan is located between the top and bottom portions of the belt and the bottom surface of the top portion of the belt is further supported by the pan. The water induction system controls the moisture content of the icing. The water induction system includes a moisture sensor for sensing the water content of icing in the system, a controllable water injector for adding water to icing in the system, and a controller coupled to the moisture sensor and the water injector to cause water to be added to maintain icing within the moisture content required to maintain selected properties of icing flowing within the system, wherein the flow rate of the icing pump is controlled to force icing into the pan through the openings of the belt and above the top surface of a belt such that at least a portion of the surfaces of bakery located on the belt are resting within and coated with icing.

Another embodiment relates to a method of preparing bakery such as donuts and cookies. The method includes the steps of containing icing in a temperature controlled vessel, sensing the temperature and moisture of icing contained within the vessel, heating the vessel and adding water to the icing to maintain the temperature and moisture of the icing within a predetermined range, continuously moving icing from the vessel through a belt to the top surface of the belt which supports the bakery and moving the belt while the bakery is in contact with the belt and icing for a predetermined distance.

Another embodiment relates to a combination. The combination includes a donut, a vessel, a belt, a pump and a support structure. The vessel includes temperature and moisture controlled water-based icing. The belt includes a top surface which supports the donut. The pump is for pumping icing from the vessel through the belt onto the surface of the donut. The support structure for movably supporting the belt relative to the vessel such that excess icing flows from the belt back into the vessel.

Another embodiment relates to a machine for simultaneously coating a plurality of items with a coating. Each item has a first side and a second side. The items are placed on the machine in rows which are substantially straight and substantially perpendicular to the direction of travel of the items through the machine. The machine includes a first belt including openings through which the coating can flow. The machine also includes a first conveyor having a first end and a second end. The first conveyor movably supports the first belt such that a top portion of the belt moves in a coating direction. The top portion transitions to a bottom portion of the belt at the second end, the top portion supporting and conveying a plurality of rows of a plurality of the items between the first and second ends in the coating direction.

The items are supported on the first sides. The machine further includes a first variable speed drive coupled to the first conveyor to move the top portion in the coating direction. The machine also includes a pan located between the top and bottom portions of the first belt. The machine additionally includes a variable-flow rate icing pump configured to pump the coating into the pan and through the openings to coat the first side of the items with the coating as the items move above the pan. The machine includes a second belt and a second conveyor which movably supports the second belt such that a top portion of the second belt moves in the coating direction. The machine includes a second variable speed drive coupled to the second conveyor to move the top portion of the second belt in the coating direction and a sensor which generates a signal in response to the passing of the plurality of rows of the plurality of items. The machine has a structure which supports the second conveyor relative to the first conveyor such that coated items drop from the first belt onto the top portion of the second belt. The items drop such that the items are resting upon the second sides after being dropped onto the second belt, the structure further supporting the senor relative to the top portion of the first belt proximate to the second end. The machine additionally includes a controller coupled to the variable speed drives and the sensor. The controller controls the first variable speed drive to move the top portion of the first belt at an average speed, and controls the second variable speed drive to vary the speed of the second belt in response to the signal generated by the sensor. The variable speed of the second belt is such that the second belt moves at a drop speed which is below the average speed of the first belt when the items are dropped onto the second belt.

Another embodiment relates to a method for coating a plurality of items with a coating, each item having a first side and a second side. The method including the step of placing the items on a first belt including openings through which the coating can flow. The method includes the step of movably supporting the first belt such that a top portion of the belt moves in a first direction. The top portion transitions to a bottom portion of the belt at an end. The bottom portion moves in a second direction opposite to the first direction, the top portion supporting and conveying a plurality of rows of a plurality of the items between the first and second ends in the first direction wherein the cooked items are supported on the first sides. The method further includes the step of controllably moving the top portion in the first direction at an average speed. The method also includes the step of pumping the coating into a pan located between the top and bottom portions of the first belt and through the openings to coat the first side of the items with the coating as the items move above the pan. The method further includes the step of movably supporting a second belt such that a top portion of the second belt moves in the first direction. The direction of the top portion of the second belt is such that the items are dropped from the second end of the first belt onto the top portion of the second belt. The method also includes sensing the plurality of rows of the plurality of items passing along the first belt at the end. The method further includes varying the speed of the second belt when the plurality of rows of the plurality of items are sensed. Varying the speed of the second belt is such that the second belt moves at a drop speed which is below the average speed of the top portion of the first belt when the items are dropped onto the second belt.

Another embodiment relates to a coating system for coating items with a liquid coating such as glaze, icing or frosting. The system includes a return hopper defining a reservoir for containing a coating. The system further includes a belt for conveying a food product to be coated with the coating. The belt includes openings through which the coating can flow. The system also includes a belt sprocket assembly and a belt support arrangement for movably supporting the belt. The belt is supported such that a top portion of the belt moves between the belt sprocket and the belt support in a direction and a bottom portion of the belt moves between the belt sprocket and the belt support in a direction opposite to the top portion. The top portion of the belt includes a top surface and a bottom surface. The system also includes a variable speed drive coupled to the belt sprocket arrangement. The variable speed drive is used to move the belt at a selectable speed. The system additionally includes a pan located between the top portion of the belt and the bottom portion of the belt. The system further includes a first pump in fluid communication between the reservoir and the pan. The first pump is used to move the coating from the reservoir to the pan at a first controllable flow rate. The system further includes a catch basin below the belt for receiving excess coating from the pan. The system further includes a proportional valve. The proportional valve has an input port, a first output port in fluid communication with the pan and a second output port in fluid communication with the return hopper. The proportional valve is controllable to vary a ratio of the relative flow of the coating from the first and second output ports. The system further includes a second pump in fluid communication between the catch basin and the input port of the proportional valve. The second pump is used to move the coating from the catch basin to the input port at a second controllable flow rate. The second pump generates a first thickness signal representative of the thickness of the coating. The system further includes a structure which supports the belt sprocket assembly and the belt support arrangement and the pan. The support structure is configured such that the pan is located between the top and bottom portions of the belt and a bottom surface of the top portion of the belt is further supported by the pan. The controllable flow rates of the first and second pumps and the ratio are controlled to selectively move the coating from the return hopper and the catch basin into the pan based at least upon the thickness signal.

Another embodiment relates to a method for coating cooked items with a coating such as glaze, icing or frosting. The method includes the steps of moving cooked items on a belt over a pan. The belt includes openings through which the coating flows to a level above the belt and into contact with the items. The method further includes moving the coating from a return hopper to the pan at a first flow rate. The method further includes moving the coating from a catch basin to the pan at a second flow rate and to the return hopper at a third flow rate. The catch basin is located below the pan to catch excess coating. The method further includes controlling the first, second and third flow rates based upon the thickness of the coating from the catch basin.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 5C is a sectional view of the conveyor belt of the icing coating system along line C-C of FIG. 5B according to an exemplary embodiment.

DETAILED DESCRIPTION

Referring generally to the figures, various embodiments of an automated icing coating system for icing food products with icings such as water-based icing are shown. Typically, the food products discussed herein include pastries such as donuts, cookies, bagels, cakes, rolls, etc. The pastries may be toroidal in shape. The icing coating system is an automated process for icing pastries with an icing such as a water-based icing for an extended period of operation while maintaining the characteristics of the icing by controlling variables such as icing temperature, moisture level of the icing, speed of the conveyor belt, and/or icing flow rate. Generally, the system disclosed herein includes a continuous conveyor belt for moving the pastries through the system controlled by a variable speed drive, a temperature regulated icing return hopper, a variable flow rate icing pump, and a structure to support the system. Furthermore, the configuration of the system disclosed herein reduces the amount the icing is pumped for a given number of bakery pieces coated. In operation, the icing coating system can be one of many systems in a pastry decorating line system.

Figure 1A:
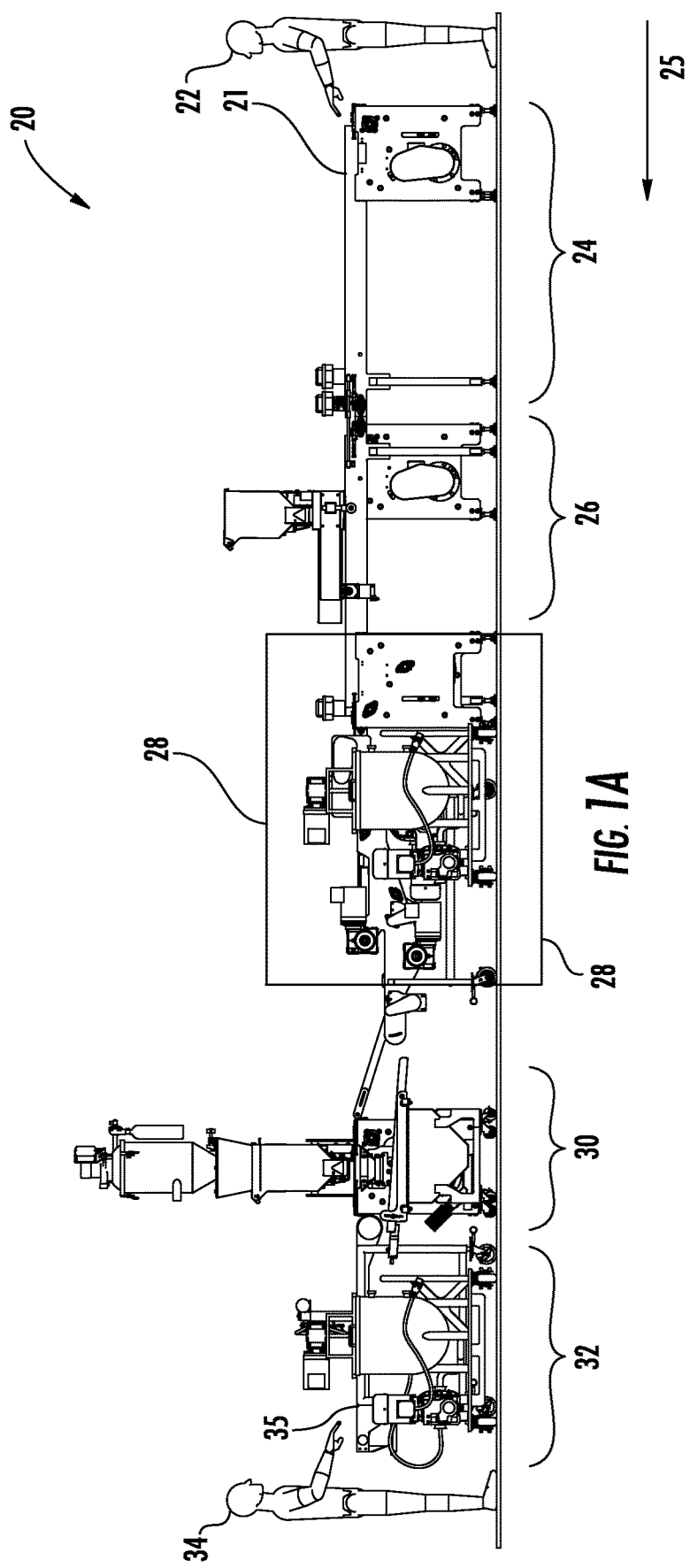
FIG. 1A is a side view of a pastry decorating line system according to an exemplary embodiment, which includes an organizing system, an injection system, an icing coating system, a topping system, and a drizzling system.
Figure 1B:
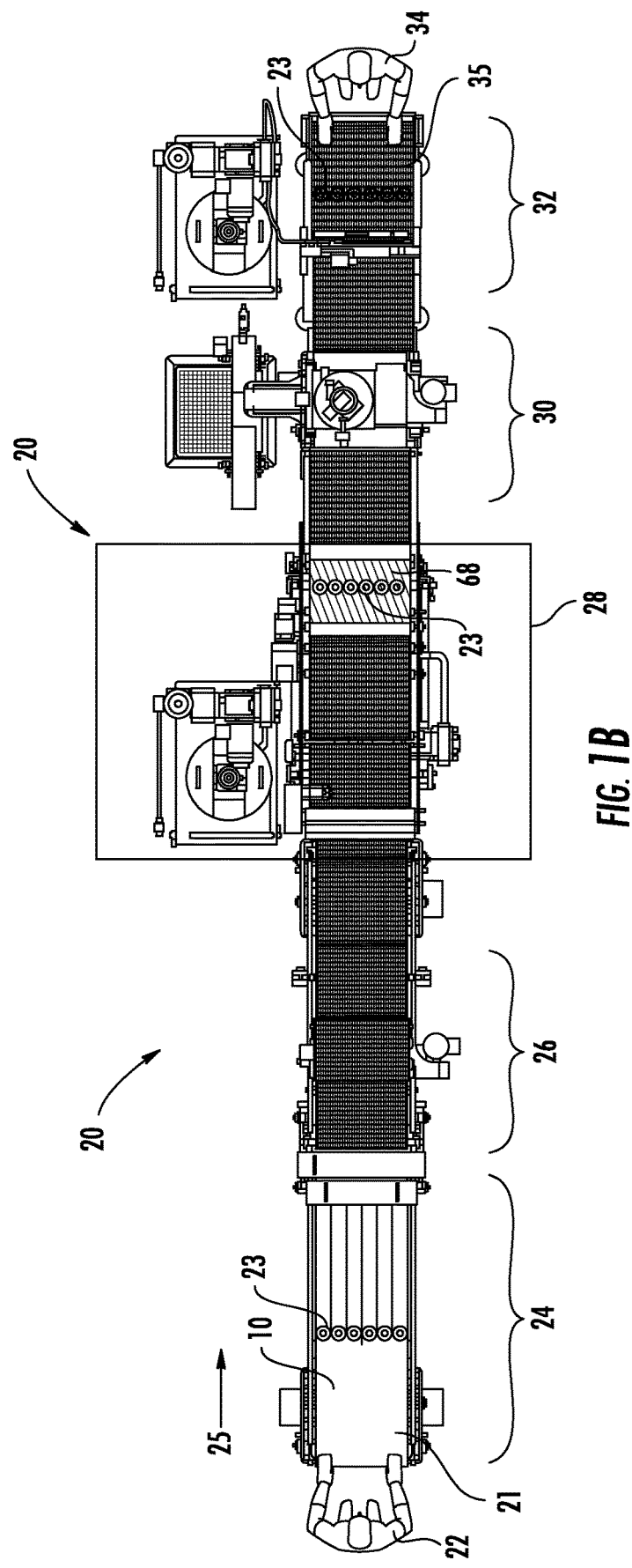
FIG. 1B is a top view of the pastry decorating line system of FIG. 1A.

Referring to FIGS. 1A and 1B, a pastry decorating line system 20 is shown according to an exemplary embodiment. FIG. 1A shows a side view of pastry decorating line system 20 while FIG. 1B shows the top view of pastry decorating line system 20. Pastry decorating line system 20 includes an organizing system 24, an injection system 26, an icing coating system 28, a topping system 30 and a drizzling system 32. A first operator 22 feeds pastries 23 into the pastry decorating line system 20 at input point 21. Pastries 23 move down pastry decorating line system 20 by way of a series of conveyor belts in the direction shown by arrow 25. In the embodiment shown in FIG. 1A and FIG. 1B, pastries 23 are first lined up into rows by organizing system 24 on a conveyor 10. The conveyor 10 is a series of belts that extend from the organizing system 24 to the drizzling system 32. In one embodiment within coating system 28, the conveyor 10 includes conveyor belts 10a, 10b, and 10c. Conveyor belts 10a and 10b are fabricated from stainless steel wire to form a belt mesh 104 which defines a plurality of openings 102. Conveyor belt 10c may be fabricated from a stainless steel mesh belt or a polyurethane belt which may be scraped with a scraper 47a and/or 47b (see FIG. 5C and FIG. 8A) to remove icing from belt 10c during operation. In another embodiment, within coating system 28, conveyor 10 includes a single continuous conveyor belt. The conveyor 10 transports pastries 23 from organizing system 24 to injection system 26. At injection system 26, pastries 23 are injected with a filling. Conveyor 10 continues to transport pastries 23 from injection system 26 to icing coating system 28. A portion of pastries 23 are coated with a layer of icing 68 at icing coating system 28. In one embodiment, icing 68 may be chocolate flavored. In other embodiments, icing 68 may be other flavors such as vanilla, maple, strawberry, etc. Pastries 23 with icing 68 continue to be transported on conveyor 10 from ice coating system 28 to topping system 30. Topping system 30 dispenses a topping, such as sprinkles, powder sugar, etc., onto pastries 23 with icing 68. Pastries 23 with icing 68 and topping continue to be transported from topping system 30 to drizzling system 32. Pastries 23 are drizzled with a second icing at drizzling system 32. The systems that make up pastry decorating line system 20 can be removed and/or interchanged to produce the desired pastry. For example, pastry decorating line system 20 may not include injection system 26 or topping system 30, but may still include icing coating system 28 and drizzling system 32. Once the pastries 23 are through pastry decorating line system 20, a second operator 34 removes pastries 23 from pastry decorating line system 20 from output point 35. In one embodiment, pastries 23 are complete at output point 35. In another embodiment, pastries 23 are then directed to a packaging system where they are packaged for sale and/or storage.

Figure 2:
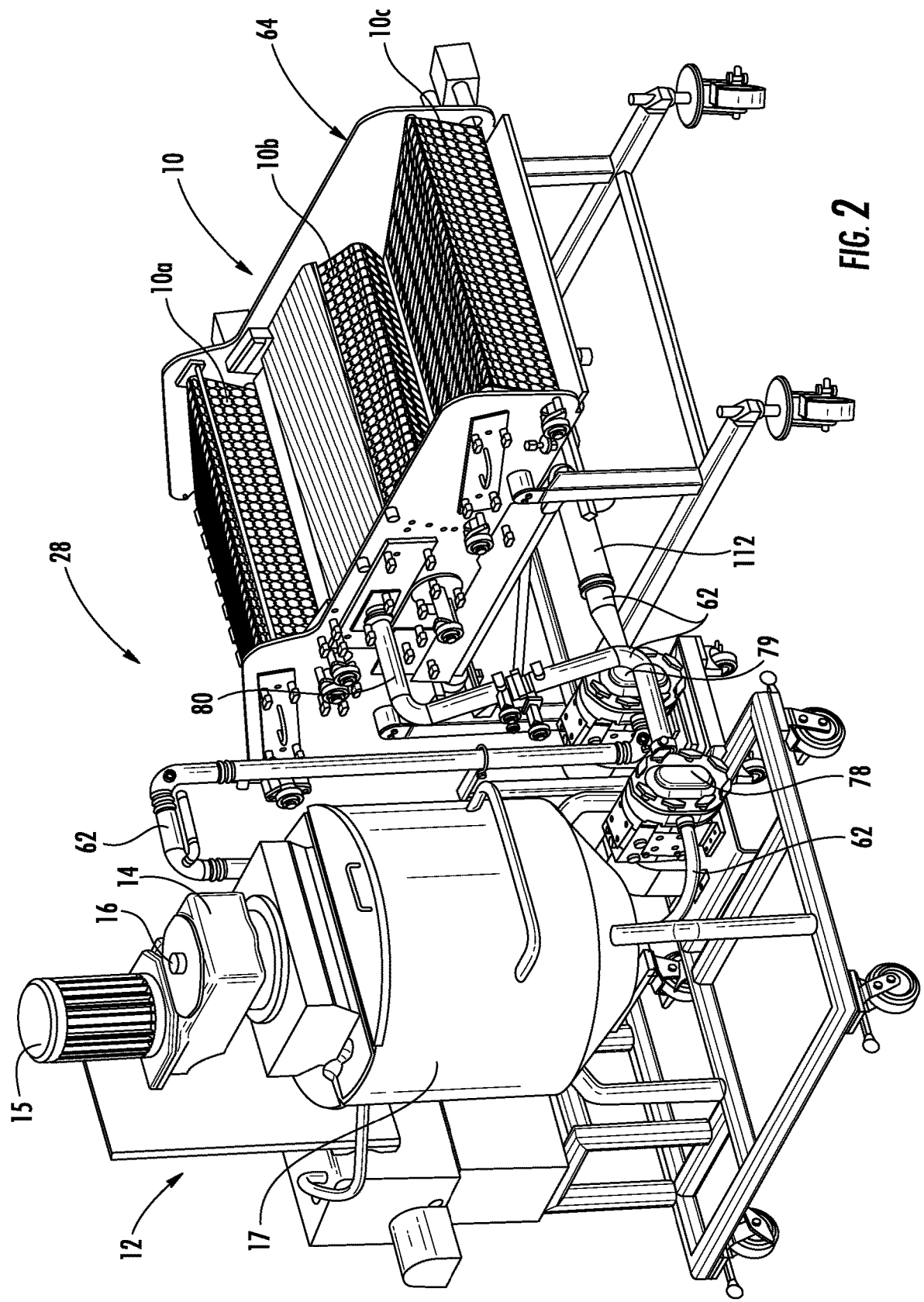
FIG. 2 is a perspective view of an icing coating system according to an exemplary embodiment.

Referring to FIG. 2, an embodiment of icing coating system 28 is shown that includes conveyor belts 10a, 10b and 10c, an icing return hopper 12 and a support structure 64. Icing 68 is transported between return hopper 12 and conveyor belt 10b. Icing coating system 28 also includes a controller 202 (shown in FIG. 6) and a temperature sensor 204 (shown in FIG. 6) that are associated with monitoring the temperature, moisture content and flow rate of icing 68. In one embodiment, controller 202 and temperature sensor 204 maintain the temperature of icing 68 in icing coating system 28 between 115° F. and 135° F., specifically between 120° F. and 130° F. and more specifically, the temperature of icing 68 may be approximately 125° F. In another embodiment, the target temperature may be at about 105° F. because some types of icing and frostings are too viscous for coating purposes below 105° F. and break down too fast above 105° F. Accordingly, it would be advantageous to maintain the icing ideally near 105° F. or at least within the range of 100° F. to 110° F. Return hopper 12 includes a gear reduction drive 14, a motor 15, a shaft 16, a reservoir 17, a heat exchanger 208 (shown in FIG. 6), conduit 62 and a paddle 11 (shown in FIG. 4). Return hopper 12 is temperature regulated which includes walls defining reservoir 17. Gear reduction drive 14 and motor 15 operate together to control the movement of shaft 16. Shaft 16 extends from outside reservoir 17 into the interior of reservoir 17. During operation of icing coating system 28, icing 68 is pumped through conduit 62 from return hopper 12 to an icing pan 70 by a variable-flow rate icing pump 78. Icing 68 enters icing pan 70 through a pump outlet 80. Another portion of conduit 62 extends from a catch basin 7, located underneath a portion of conveyor belt 10b, to return hopper 12. A second variable-flow rate icing pump 79 pumps icing 68 from catch basin 7 back to return hopper 12. Portions of conduit 62 may have temperature regulated water flowing in an insulated jacket 112 to maintain proper flow rate of icing 68 throughout icing coating system 28. Insulated jacket 112 extends around the entire circumference of conduit 62 and includes water flowing between insulated jacket 112 and the exterior surface of conduit 62. Support structure 64 houses a portion of icing coating system 28 and supports various parts of icing coating system 28 discussed below. In one embodiment, support structure 64 is on wheels to make icing coating system 28 more portable.

Figure 3:
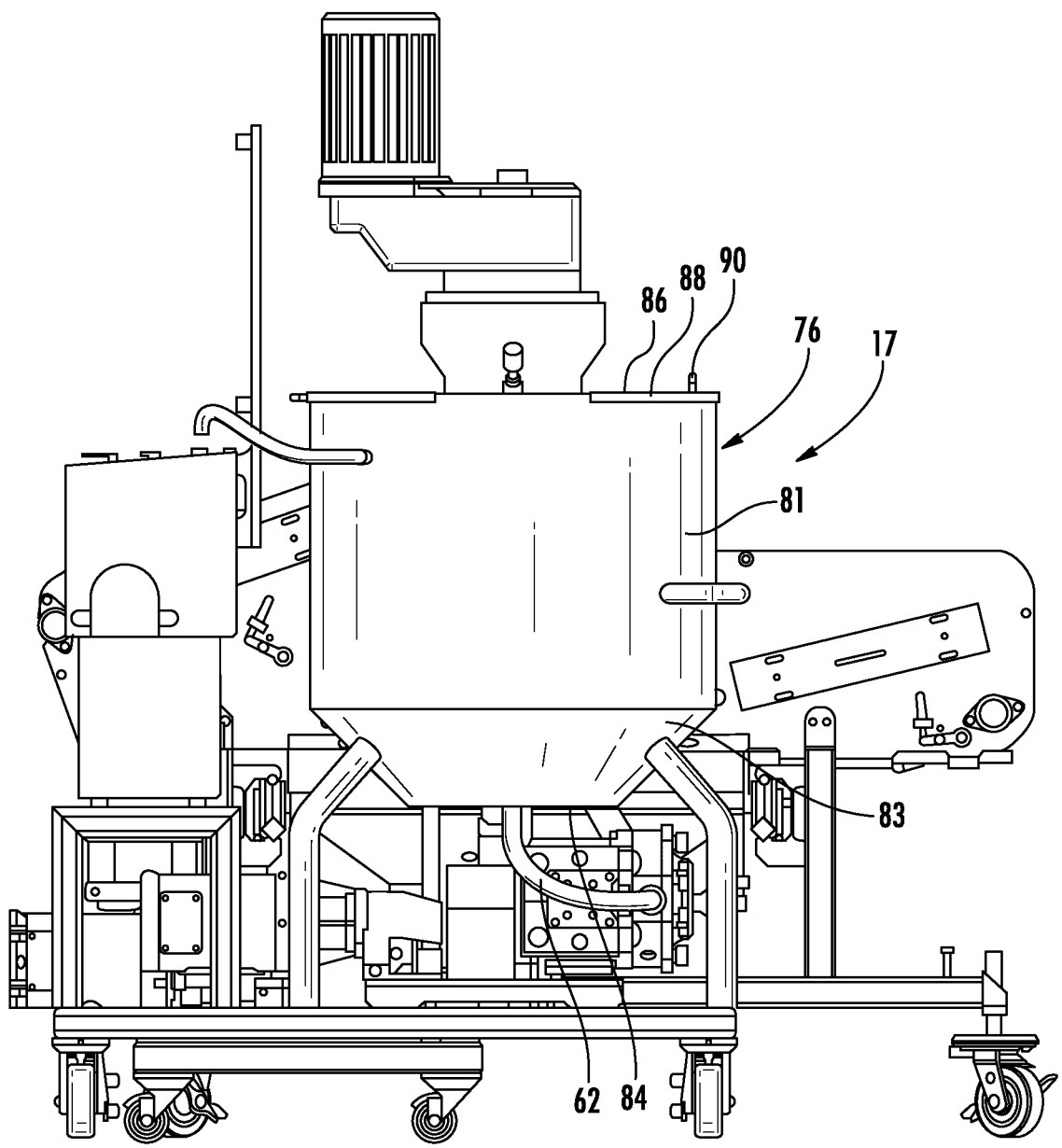
FIG. 3 is a side view of a hopper of the ice coating system according to an exemplary embodiment.

Referring to FIG. 3, reservoir 17 is a temperature regulated double wall structure that includes an outer wall structure 76 and an inner wall structure 18 (shown in FIG. 4) that contains icing 68. Heat exchanger 208 is in thermal communication with outer wall structure 76 and inner wall structure 18 of reservoir 17. Outer wall structure 76 includes a cylindrical wall 81, an angled wall 83, a bottom end 84 and a top end 86. Top end 86 receives a portion of conduit 62 and is generally circular in shape and includes a door 88 and a first opening (not shown in figures). Door 88 provides a user access to cavity 9 (shown in FIG. 4) of reservoir 17 by lifting a handle 90. Door 88 is coupled to top end 86 by a hinge, fastener, etc., allowing door 88 to move about the hinge. Top end 86 is adjacent to cylindrical wall 81. Cylindrical wall 81 extends between top end 86 and angled wall 83. Angled wall 83 extends from cylindrical wall 81 towards bottom end 84. Angled wall 83 is generally frustoconical in shape and includes diameters with varying lengths. For example, the diameter of angled wall 83 near the cylindrical wall 81 is greater than the diameter of angled wall 83 near bottom end 84. Bottom end 84 is adjacent to angled wall 83 and is generally circular in shape. Bottom end 84 includes a second opening that receives a portion of conduit 62. In other embodiments reservoir 17 may have different configurations and shapes in order to operate with a variety of systems. For example, reservoir 17 may be more rectangular in shape, with the bottom end and top end being more rectangular in shape as well. Additionally, it is preferable to provide an insulation filling gap (e.g., filled with foam insulation) between inner wall structure 18 and outer wall structure 76.

Figure 4:
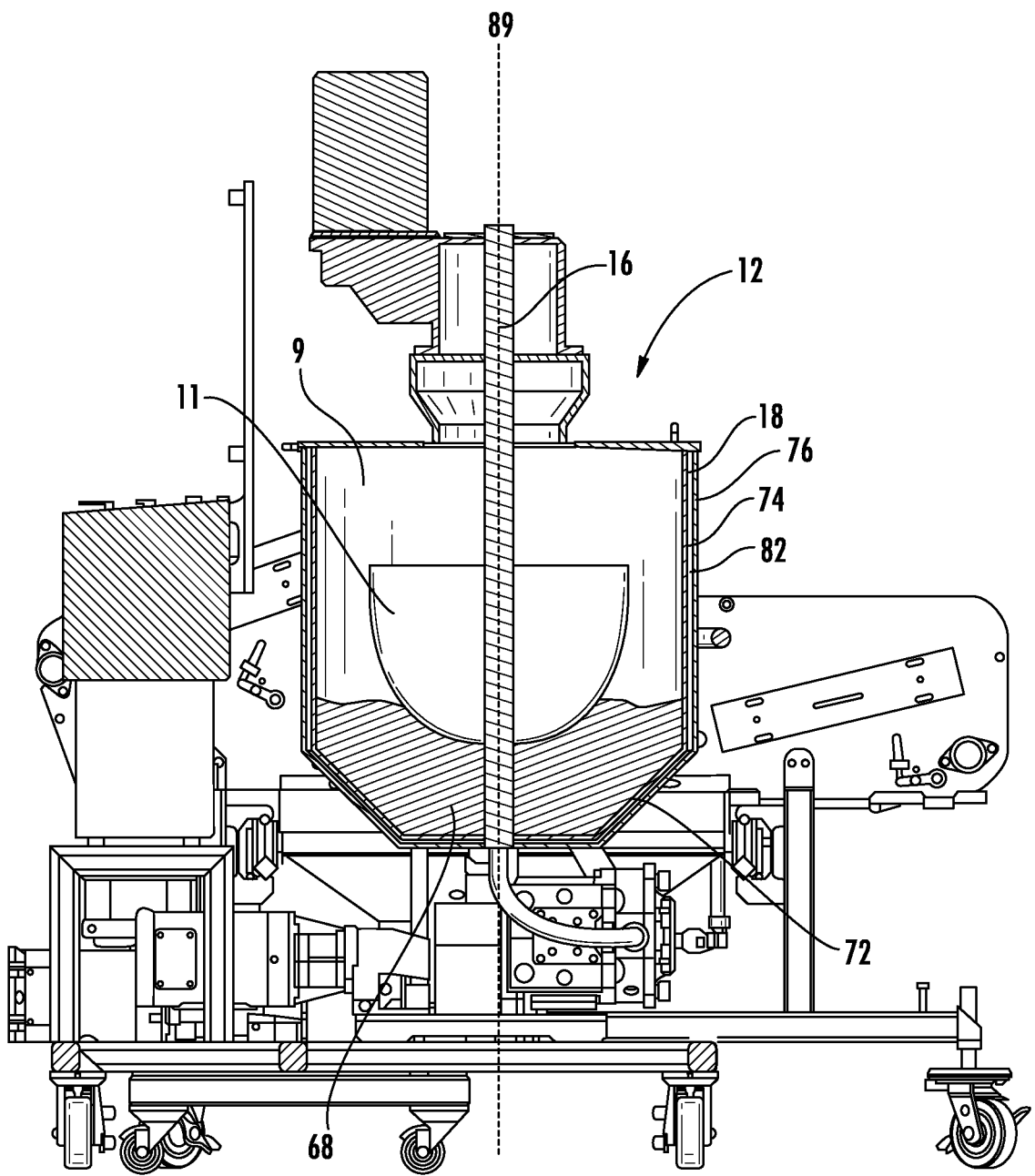
FIG. 4 is a cross-section view of the hopper of the ice coating system according to an exemplary embodiment.

Referring to FIG. 4, the inner wall structure 18 includes an inner cylindrical wall 74 and an inner angled wall 72 that defines a cavity 9 that contains icing 68 in return hopper 12. Outer wall structure 76 of reservoir 17 is in thermal communication with a heat exchanger 208, which heats a fluid jacket 82. Fluid jacket 82 is located in the space between inner wall structure 18 and outer wall structure 76. Fluid jacket 82 includes a fluid flowing at a predefined temperature, such as water, to regulate the temperature of icing 68 to reduce evaporation of moisture from icing 68 in return hopper 12. In other embodiments, return hopper 12 may be resistively heated and the fluid flowing in fluid jacket 82 may be in the form of steam or mist. The temperature control for temperature regulated icing 68 in return hopper 12 is described below.

Referring to FIG. 4, the paddle 11 extends from the shaft 16 in cavity 9 of reservoir 17. Water is introduced into the reservoir 17 in the form of mist, steam or both via shaft 16 or a separate spray or mist nozzle. In the exemplary embodiment, paddle 11 rotates around a central axis 89 at the same rate as shaft 16 and is used to continuously move or agitate icing 68 located in cavity 9 of reservoir 17. In other embodiments, paddle 11 may move up and down repeatedly in a vertical direction in order to continuously move icing 68 located in cavity 9 of reservoir 17 or paddle 11 may move both in a vertical direction, while simultaneously rotating around central axis 89. In addition to paddle 11, an assembly of plastic scrapers may be attached to shaft 16 to rotate with the paddle and scrape the interior of the reservoir during operation.

Figure 5A:
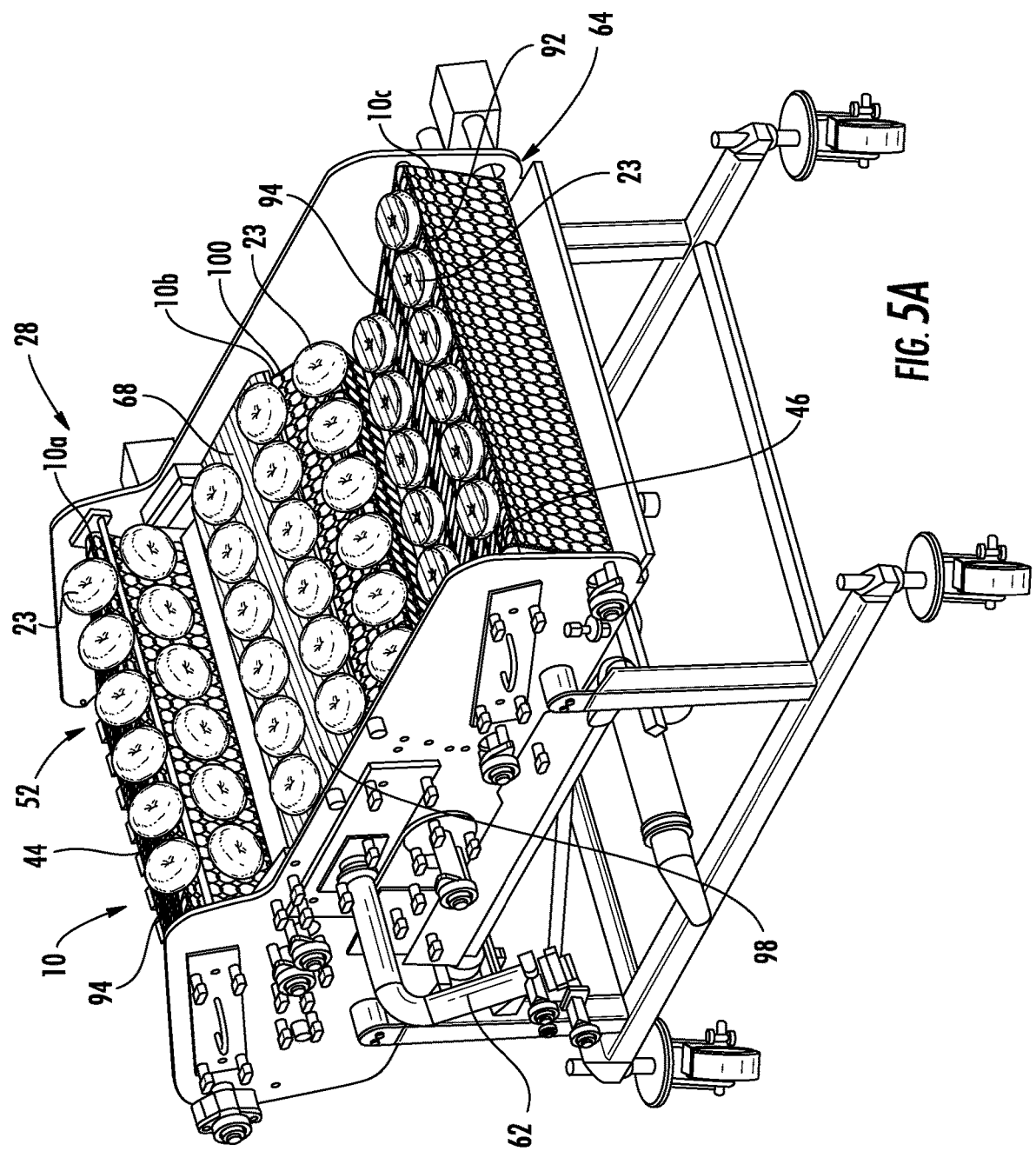
FIG. 5A is a perspective view of a conveyor belt of the ice coating system according to an exemplary embodiment.
Figure 5B:
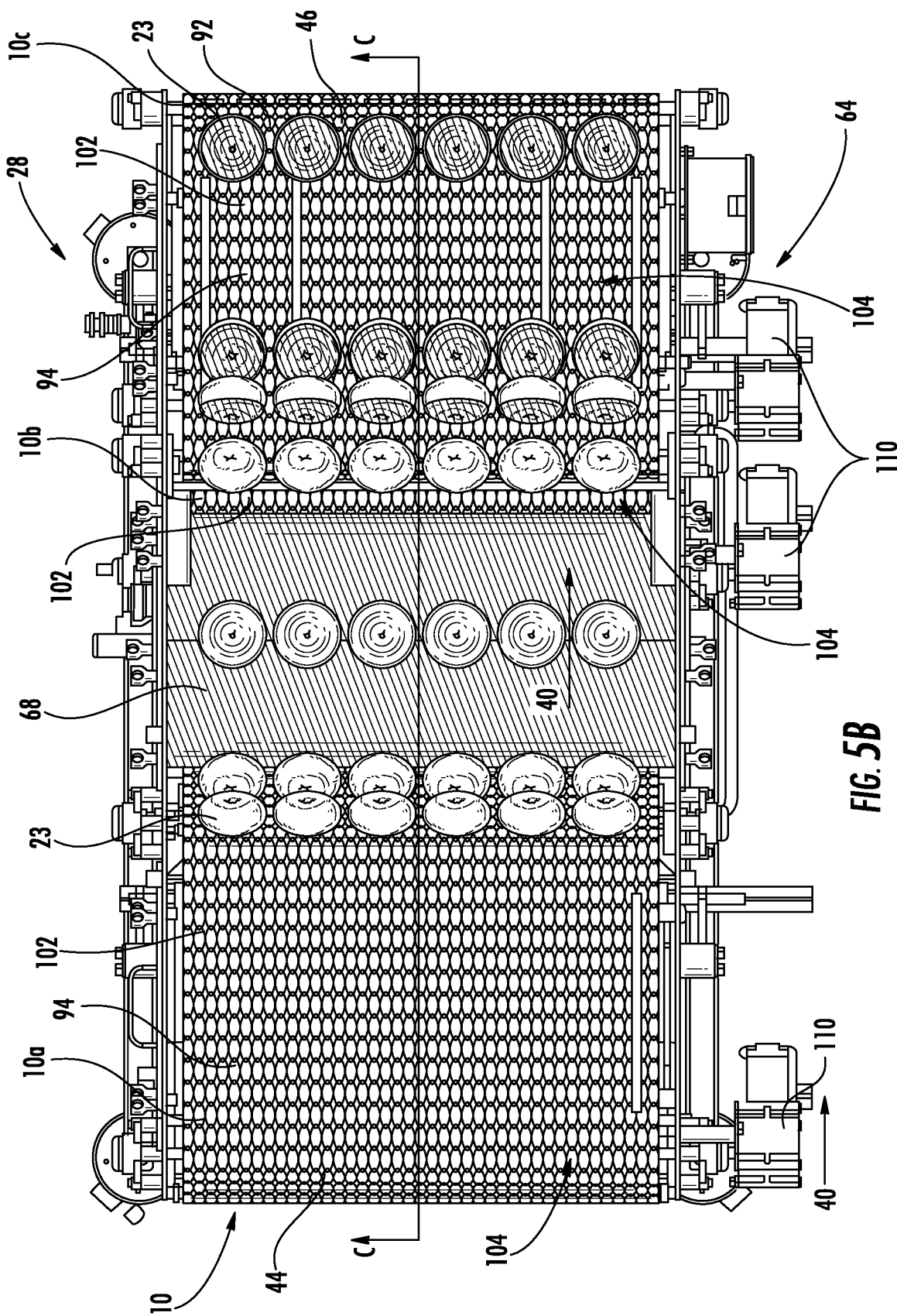
FIG. 5B is a top view of the conveyor belt of the icing coating system of FIG. 5A according to an exemplary embodiment.

Referring to FIGS. 5A-5C, an exemplary embodiment of icing coating system 28 is shown. FIG. 5A shows a perspective view of icing coating system 28. FIG. 5B shows a top view of icing coating system 28. FIG. 5C shows a sectional view of icing coating system 28 along line C of FIG. 5B.

Referring to FIGS. 5A-5C, support structure 64 supports a belt sprocket assembly, a belt support arrangement and icing pan 70. Conveyor belts 10a-c of icing coating system 28 are continuous belts for conveying food product, such as pastries, donuts, cookies, etc., to be coated with icing 68. Conveyor belts 10a-c are engaged with and movably supported by belt sprocket assembly that includes a plurality of sprockets 36 and belt support arrangement that includes a plurality of cylinders 38. The plurality of cylinders 38 are connected by bearings to support structure 64 and are supported by support structure 64. Cylinders 38 are substantially perpendicular to the direction of travel of conveyor belts 10a-c of icing coating system 28. The belt sprocket assembly and belt support arrangement are configured such that top portions 52 of conveyor belts 10a-c move between cylinders 38 in a first direction 40 and bottom portions 54 of conveyor belts 10a-c moves between cylinders 38 in a second direction 42 opposite to first direction 40 of top portions 52. The top portions 52 have top surfaces 94 and bottom surfaces 96. In other embodiments, conveyor belts 10a-c may be able to change directions during or in between operation(s) of icing coating system 28.

Figure 8A:
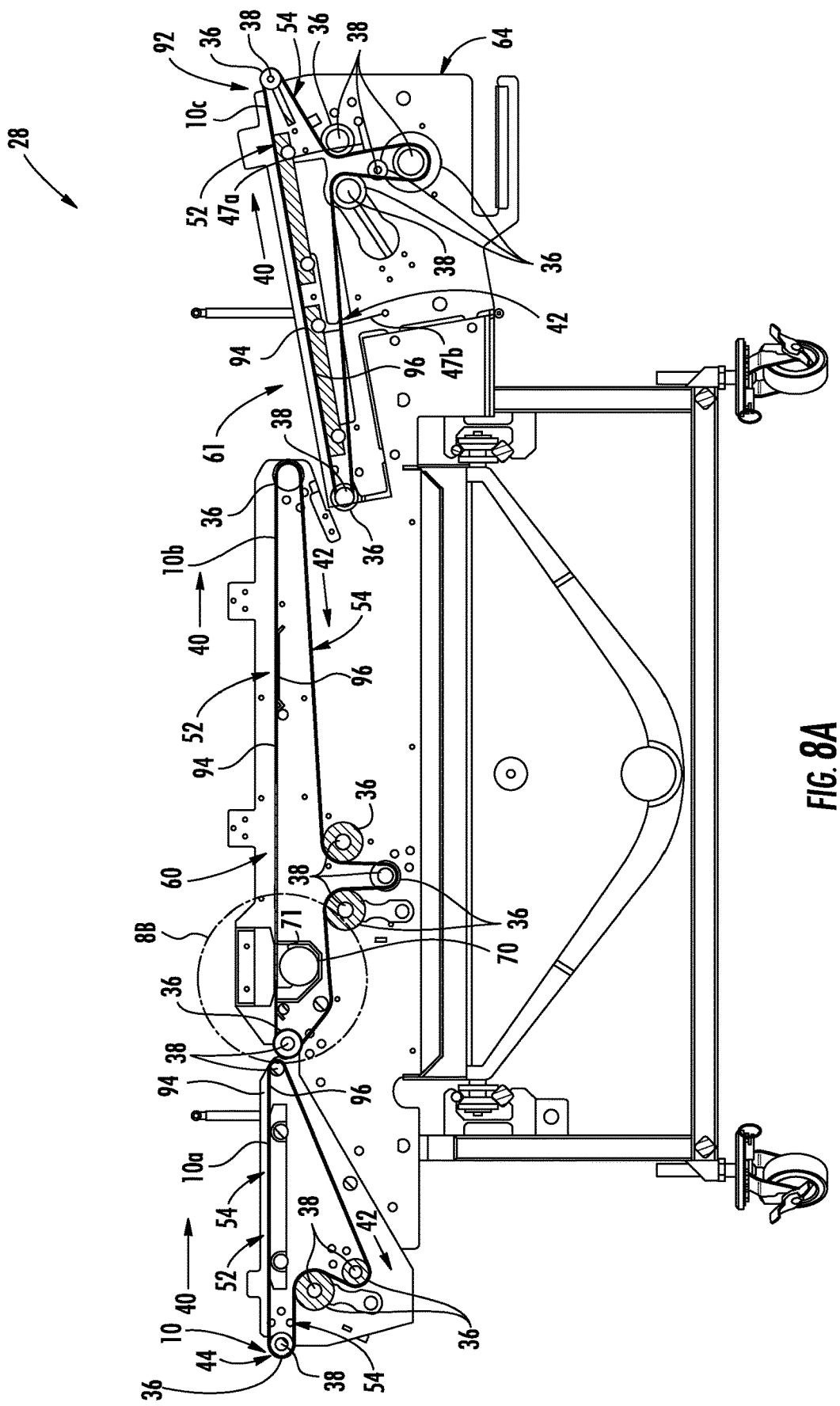
FIG. 8A is a sectional view of another embodiment of the conveyor belt of the icing coating system.

In the embodiment shown in FIGS. 5A-5C, a plurality of pastries 23 is shown entering icing coating system 28 at input end 44 and exit at an output end 92 transporting pastries 23 to topping system 30 (shown in FIG. 1A and FIG. 1B). Icing coating system 28 includes an in-feed conveyor 58 including conveyor belt 10a, icing conveyor 60 including conveyor belt 10b, and out-feed conveyor 61 including conveyor belt 10c. Pastries 23 first enter at in-feed conveyor 58, continue to be transported to icing conveyor 60, and then are transported to out-feed conveyor 61. In-feed conveyor 58 is angled such that the input end 44 is lower than the end near the icing conveyor 60. In-feed conveyor 58 is located before icing conveyor 60 in a configuration that allows pastries 23 to be rotated/flipped 180° as they transition from in-feed conveyor 58 onto icing conveyor 60 of icing coating system 28 in the direction shown by arrow 66. In other embodiments such as shown in FIG. 8A, in-feed conveyor 58 is not angled, such that pastries 23 enter icing coating system 28 at input end 44 from in-feed conveyor 58 at the same relative level as icing conveyor 60 and pastries 23 are not rotated 180° as they enter icing conveyor 60. In other embodiments, an operator can load the pastries 23 directly onto in-feed conveyor 58 at the input end 44 of icing coating system 28.

Figure 8B:
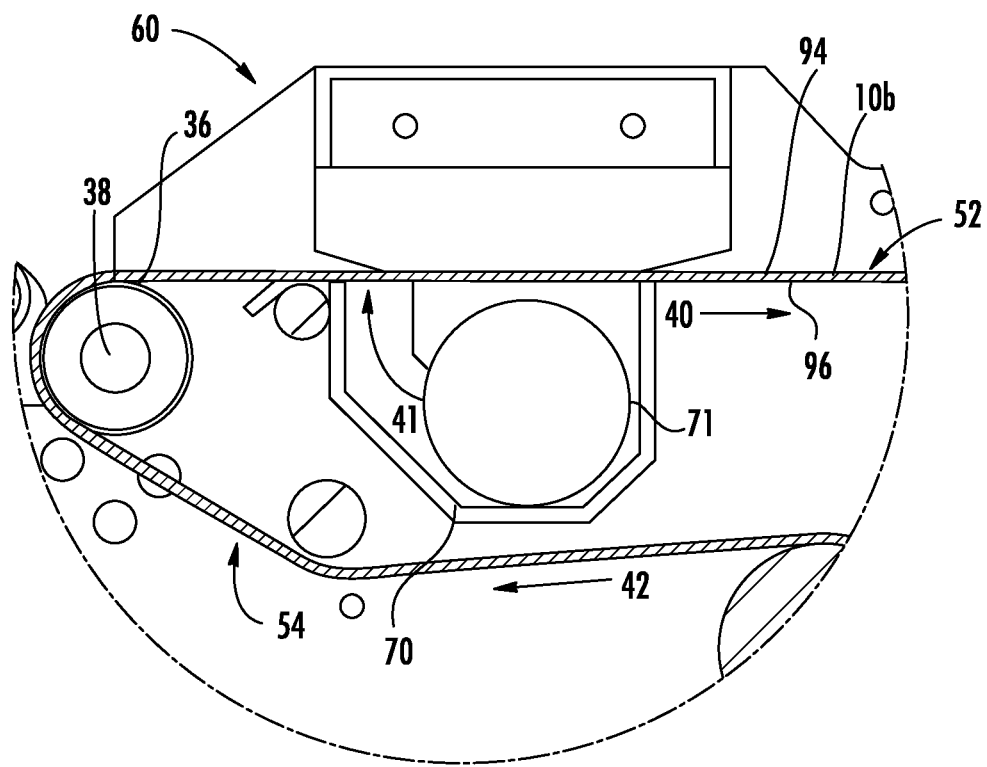
FIG. 8B is a close up view of a portion of the icing conveyor of the icing coating system of FIG. 8A.

Referring to FIGS. 5A-5C, icing conveyor 60 receives pastries 23 from in-feed conveyor 58. The top portion 52 of icing conveyor 60 is located below the end of in-feed conveyor 58 near icing conveyor 60 such that there is a vertical distance between the top portion 52 of in-feed conveyor 58 and top portion 52 of icing conveyor 60. Top portion 52 of icing conveyor 60 includes a substantially horizontal section 98 and an angled section 100. The angled section 100 extends downwards from the horizontal section 98 towards out-feed conveyor 61. Icing conveyor 60 includes icing pan 70 located in between top portion 52 and bottom portion 54 of conveyor belt 10b. More specifically, the bottom surface 96 of top portion 52 of conveyor belt 10b is further supported by icing pan 70. Variable-rate icing pump 78 continuously pumps icing 68 from return hopper 12 into icing pan 70 via a distribution tube 71 having a plurality of openings located in the tube to cause icing 68 to flow from distribution tube 71 in direction 41 opposite to direction 40. By way of example, the openings in distribution tube 71 may be circular holes spaced along the tube and exiting the tube in direction 41 where the spacing of the openings is selected depending upon the icing type and frosting flow required for a particular coating operation. The ratio of the volume of icing pan 70 to the volume of distribution tube 71 is between 0.045 and 0.055 and in one embodiment is exactly 0.05. In an alternative embodiment depicted in FIG. 8A and FIG. 8B the ratio of the volume of icing pan 70 to the volume of distribution tube 71 is higher, ranging from 0.9 to 1.1 and in another embodiment is exactly 1.0. A higher volume ratio between the icing pan 70 and the distribution tube 71 allows more of the icing 68 to remain in the tube 71 resulting in less evaporation. The flow rate of variable-rate icing pump 78 is controlled to force icing 68 into icing pan 70 through openings 102 of conveyor belt 10b and above top surface 94 of conveyor belt 10b such that at least a portion of pastries 23 on top surface 94 of conveyor belt 10b are resting within and are then coated with icing 68. By causing the icing to flow in direction 41, the icing level is higher above conveyor belt 10b in the direction 41 than in direction 40 which improves the coating of the pastries 23 by providing a higher icing level when the pastry first comes into contact with the coating (direction 41 is omitted in FIG. 8A do to size constraints, see FIG. 8B for a close up view). The horizontal section 98 receives pastries 23 from in-feed conveyor 58. Pastries 23 are transported on icing conveyor 60 towards out-feed conveyor 61. A portion of pastries 23 are coated with a layer of icing 68 when pastries 23 pass through the layer of icing 68 formed above the top surface 94. Pastries 23 continue to be transported from horizontal section 98 towards angled section 100 with the iced side facing down towards top surface 94. In other embodiments, a roller assembly system is located above layer of icing 68 to ensure that pastries 23 are held down into layer of icing 68, thereby preventing pastries 23 to float on top of layer of icing 68 and failing to maintain a depth sufficient to coat a portion of pastries 23 with icing 68.

Referring to FIGS. 5A-5C, pastries 23 are transported down angled section 100 towards out-feed conveyor 61. Angled section 100 is angled such that pastries 23 rotate approximately 180° from icing conveyor 60 onto out-feed conveyor 61. In other embodiments, such as depicted in FIG. 8A, icing conveyor 60 does not contain an angled section 100. In such embodiments, the distance between icing conveyor 60 and out-feed conveyor 61 is such that pastries 23 will rotate approximately 180° when transitioning from icing conveyor 60 onto out-feed conveyor 61. Top portion 52 of icing conveyor 60 is located above top portion 52 of out-feed conveyor 61 such that there is a vertical distance between the top portion 52 of icing conveyor 60 and out-feed conveyor 61. The vertical distance between the in-feed conveyor 58 and icing conveyor 60 is greater than the vertical distance between the icing conveyor 60 and the out-feed conveyor 61. Out-feed conveyor 61 angles upwards such that the end near icing conveyor 60 is lower than output end 46. Out-feed conveyor 61 then moves pastries 23 coated with icing towards output end 46 of icing coating system 28. Pastries 23 with icing 68 are then complete or ready to be moved to the next system in pastry decorating line system 20, e.g., topping system 30. In other embodiments, the vertical distances may be the same between the in-feed conveyor 58 and icing conveyor 60 and icing conveyor 60 and out-feed conveyor 61. In other embodiments, the vertical distance between in-feed conveyor 58 and icing conveyor 60 may be smaller than the vertical distance between icing conveyor 60 and out-feed conveyor 61.

Referring to FIGS. 5A-5C, in operation, by continuously pumping icing 68 into icing pan 70, icing 68 passes through the openings 102 of the belt mesh 104, such that icing 68 forms a layer above the belt mesh 104 above icing pan 70. Any excess icing 68 that does not adhere to pastries 23 spills over from icing pan 70 to catch basin 7. Icing 68 that spills over to catch basin 7 is pumped back to return hopper 12 by second variable-flow rate icing pump 79 (shown in FIG. 2) through a portion of conduit 62. Variable-flow rate icing pump 78 is in fluid communication between icing pan 70 and reservoir 17 to pump icing 68 from reservoir 17 to icing pan 70. Second variable-flow rate pump 79 is in fluid communication between catch basin 7 and reservoir 17 to pump execs icing 68 from catch basin 7 to reservoir 17. In another embodiment, icing pan 70 is located under both top portion 52 and bottom portion 54 of icing conveyor 60. Top portion 52 and bottom portion 54 of icing conveyor 60 are configured close together so that icing 68 from icing pan 70 may flow up through both portions of icing conveyor 60 and create a layer of icing 68 on top portion 52 of icing conveyor 60 above belt mesh 104.

Referring to FIGS. 5A-5C, the thickness of icing 68 located above openings 102 is controlled by pump flow rate and the speeds of conveyor belts 10a-c of in-feed conveyor 58, icing conveyor 60 and out-feed conveyor 61. Conveyor belts 10a-c of in-feed conveyor 58, icing conveyor 60 and out-feed conveyor 61 are controlled by a variable speed drive that is coupled to the belt sprocket arrangement to move conveyor belts 10a-c of in-feed conveyor 58, icing conveyor 60 and out-feed conveyor 61 at a selectable speed. The flow rate of variable-flow rate icing pump 78 may also be adjusted to reach the desirable thickness for the layer of icing 68. The variable-flow rate icing pump 78 is in fluid communication between reservoir 17 and icing pan 70 to pump icing 68 from reservoir 17 to icing pan 70. The speed control for in-feed conveyor 58, icing conveyor 60 and out-feed conveyor 61 and the flow rate control for variable-flow rate icing pump 78 are described below.

Figure 5D:
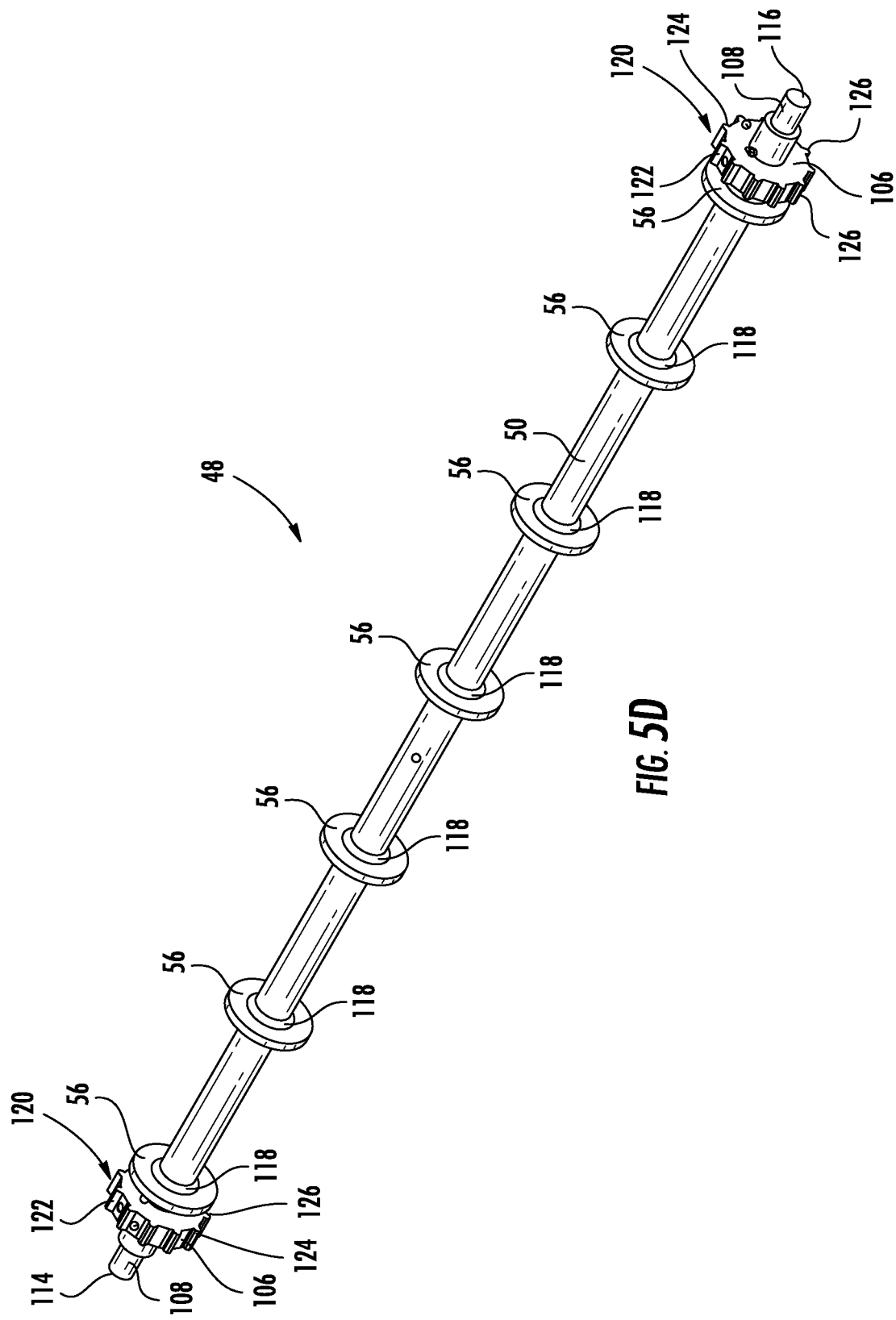
FIG. 5D is a perspective view of a tracker shaft of the ice coating system labeled as 5D in FIG. 5C according to an exemplary embodiment.

Referring to FIG. 5D, icing conveyor 60 includes a tracker shaft 48. Tracker shaft 48 includes a sleeve 50, a plurality of discs 56, a pair of drive sprockets 106 and a shaft 108. Tracker shaft 48 supports a portion of icing conveyor 60 and secured to support structure 64 with a fastening device, e.g., bolts and nuts. Shaft 108 includes a first end 114 and a second end 116. The distance between first end 114 and second end 116 is greater than the width of icing conveyor 60. Shaft 108 is cylindrical in shape fabricated from various types of metal, e.g. steel. In other embodiments shaft 108 may be made of a thermoplastic material and in various shapes and lengths. Sleeve 50 is annular in shape and encircles shaft 108. The length of sleeve 50 is less than the distance between first end 114 and second end 116 of shaft 108.

Referring to FIG. 5D, discs 56 are annular in shape with a substantially smooth surface and encompass a portion of sleeve 50. In the exemplary embodiment, tracker shaft 48 has 7 discs 56 that are evenly spaced apart from each other on sleeve 50 between drive sprockets 106. For example, the distance between two neighboring discs 56 may be 10 inches and the distance between another set of two neighboring discs 56 is also 10 inches. In other embodiments, there may be more or less than 7 discs 56 and discs 56 may be spaced apart from each other with varying distances. For example, the distance between a set of neighboring discs 56 may be 10 inches and the distance between another set of neighboring discs 56 may be less than or greater than 10 inches. Each disc 56 includes a pair of washers 118 with one washer 118 abutting each side of disc 56. One washer 118 faces towards first end 114 and the other washer 118 faces towards second end 116. Washers 118 are annular in shape and encompass sleeve 50. The diameter of washers 118 is less than the diameter of discs 56. In one embodiment, discs 56 may rotate freely on shaft 108 between washers 118 to improve the support of icing conveyor 60 so that the amount of icing 68 from pastries 23 with icing 68 (e.g., donuts) which may be pulled from pastry 23 when it passes over tracker shaft 48 is reduced.

Referring to FIG. 5D, drive sprockets 106 are located near the ends of tracker shaft 48. One drive sprocket 106 is located near first end 114 and the other drive sprocket is located near second end 116. Drive sprockets have a center opening that permit shaft 108 and sleeve 50 to pass through drive sprocket 106. Drive sprockets 106 include a plurality of teeth 120. Each tooth 120 includes an angled portion 122, a rounded portion 124 and a tip 126. Teeth 120 extend from the outer surface of drive sprocket 106 at an angle less than 90° towards tip 126. Tip 126 is the area of tooth 120 that is located farthest from the outer surface of drive sprocket 106. Rounded portion 124 extends from tip 126 towards the outer surface of drive sprocket 106 forming a curve. Teeth 120 are formed to not remove a substantial portion of icing 68 on pastry 23 that it may come in contact with on icing conveyor 60. In other embodiments, teeth 120 may not include a rounded portion 124 and include 2 angled portions 122 or teeth 120 may not include angled portion 122 and include 2 rounded portions 124. Teeth 120 may also extend from the outer surface of drive sprocket 106 at an angle that is greater than 90°.

Figure 6:
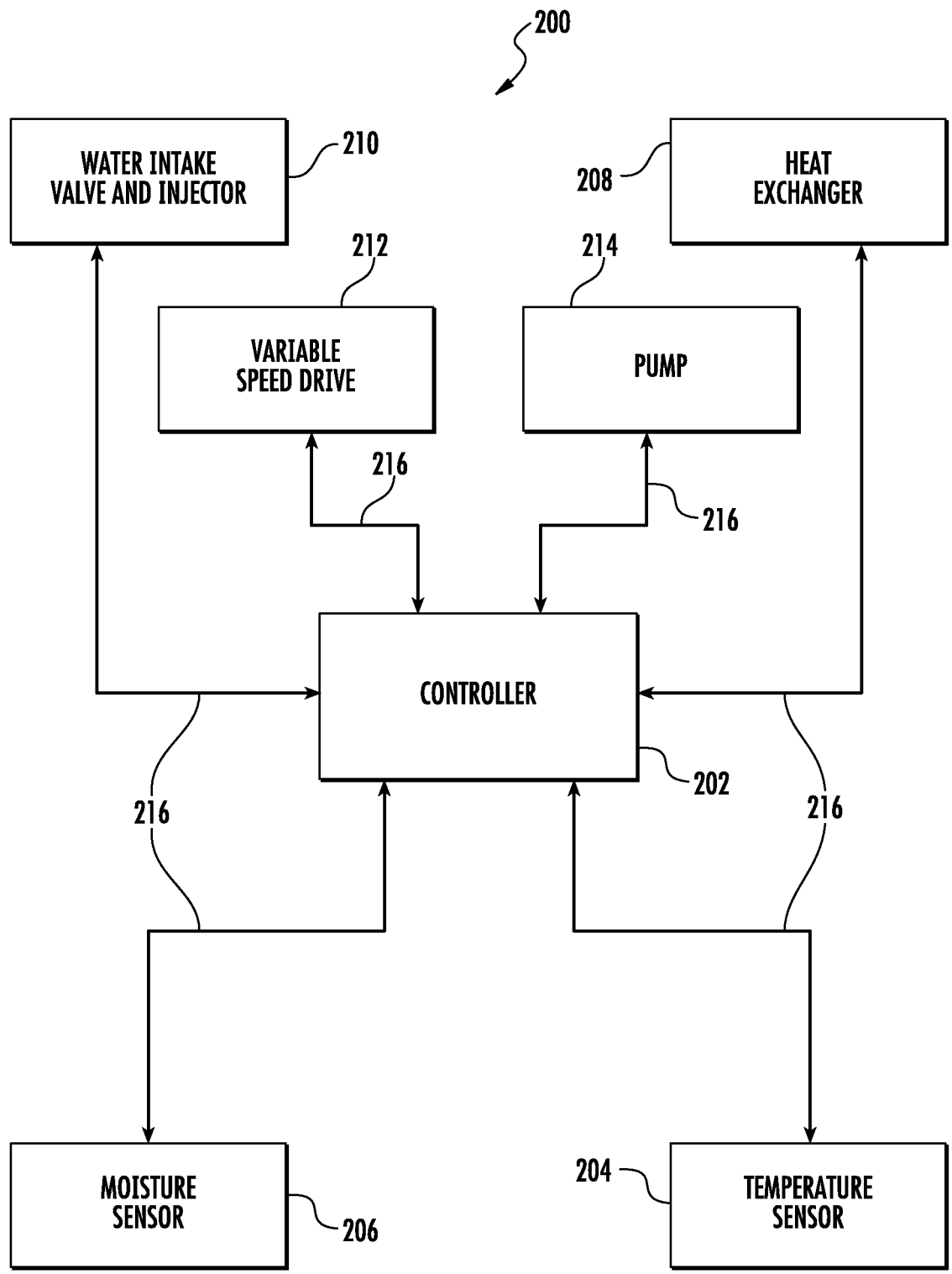
FIG. 6 is a diagram of a control system for the icing coating system according to an exemplary embodiment.

Referring to FIG. 6, icing coating system 28 may include one or more control systems 200 configured to control the operation of icing coating system 28 to provide for effective and/or efficient icing of pastries 23 over an extended operation period. In one embodiment, control system 200 is configured to control the temperature of icing 68 in icing coating system 28, the moisture level of icing 68 in icing coating system 28, the speed of conveyor belts 10a-c of in-feed conveyor 58, icing conveyor 60, and out-feed conveyor 61, and the flow rate of variable-flow rate icing pumps 78 and 79 in a fluid control system. Various embodiments of control system 200 may include all four of these controls or a combination of one or more thereof.

Referring to FIG. 6, a diagram of control system 200 configured to control icing coating system 28 is shown according to an exemplary embodiment. Control system 200 includes controller 202 coupled to one or more sensors, shown as temperature sensor 204 and moisture sensor 206. Controller 202 is also configured to generate and send control signals to a heat exchanger 208, a water intake valve 210, a variable speed drive 212 coupled to conveyor belts 10a-c, and variable-flow rate icing pumps 78 and 79. Heat exchanger 208 may be any device or combination of devices capable of heating the fluid (e.g., water) that flows through fluid jacket 82 of return hopper 12 or the fluid that flows between conduit 62 and insulated jackets 112. Water intake valve and injector 210 is a device that allows water to be introduced into icing 68 in return hopper 12. The water introduced into icing 68 in return hopper 12 may be in the form of steam, mist or both. Variable speed drive 212 is a device that determines how fast conveyor belts 10a-c move. The components of control system 200 are communicably coupled together by communication links 216 configured to transmit signals throughout control system 200 to provide the various functionalities discussed herein.

To control the temperature of icing 68 in return hopper 12, temperature sensor 204 monitors the temperature of either icing 68 inside return hopper 12, fluid in fluid jacket 82 of return hopper 12, the surface temperature of inner structure 18 and outer structure 76 of return hopper 12, or fluid between conduit 62 and insulated jackets 112. In various embodiments, temperature sensor 204 can be a variety of different temperature sensor types including, but not limited to, a thermometer, an infrared sensor, or a thermocouple sensor. In one embodiment, controller 202 adjusts the temperature of the fluid in fluid jacket 82 of return hopper 12 based on temperature information received from temperature sensor 204 to heat icing 68 in return hopper 12 to the proper temperature and/or maintain icing 68 in return hopper 12 at the proper temperature. In such embodiments, controller 202 receives a signal or data via communication link 216 from temperature sensor 204 indicative of the temperature of icing 68 in return hopper 12. If controller 202 determines that the temperature of icing 68 is above a threshold, controller 202 sends a control signal to heat exchanger 208 to reduce the temperature of the fluid in fluid jacket 82 of return hopper 12 or the fluid flowing in between conduit 62 and insulated jackets 112. If controller 202 determines that the temperature of icing 68 is below a threshold, controller 202 sends a control signal to heat exchanger 208 to increase the temperature of the fluid in fluid jacket 82 of return hopper 12 or the fluid in between the conduit 62 and insulated jacket 112 until it reaches the proper temperature. In other embodiments, heat exchanger 208 may increase the temperature of the fluid in both the fluid jacket 82 and fluid in between conduit 62 and insulated jacket 112 simultaneously.

Referring to FIG. 6, the moisture content of icing 68 in icing coating system 28 is controlled by a water induction system. The water induction system includes a moisture sensor 206, water intake valve and injector 210 and controller 202. Moisture sensor 206 senses the water content of icing 68 in icing coating system 28. Water intake valve and injector 210 adds water to icing 68 in icing coating system. Controller 202 is coupled to moisture sensor 206 and water intake valve and injector 210 to cause water to be added to icing 68 to maintain icing 68 within a percentage range of the moisture content required to maintain selected properties of icing 68 flowing within icing coating system 28. Moisture content of icing 68 may be monitored within return hopper 12, at the intake to variable-flow rate icing pump 78, within conduit 62, or at another point in icing coating system 28 depending upon the particular configuration and lengths of icing flow paths and icing area. In a preferred embodiment, controller 202 adjusts the moisture content of icing 68 by adding moisture in the form of water, mist, steam or combination of moisture forms, when the moisture content drops below a threshold value. In such an embodiment, controller 202 receives a signal or data via communication link 216 from moisture sensor 206 indicative of the moisture content of icing 68 in return hopper 12 or another area throughout icing coating system 28. If controller 202 determines that the moisture content of icing 68 is below a threshold, controller 202 sends a control signal to water intake valve and injector 210 to add moisture in the form of water, mist, steam or combination of moisture forms, to icing 68 in return hopper 12. In a preferred embodiment, water may be injected into icing 68 as icing 68 is pumped through variable-flow rate icing pump 78 to ensure mixing. In other embodiments, water may be injected into conduit 62 or return hopper 12. By controlling the moisture content of icing 68, relatively constant mechanical flow and application properties of icing 68 can be maintained during application of icing 68 to pastries 23 over an extended period of time.

Referring to FIG. 6, the speed of conveyor belts 10a-c is controlled by either an operator manually setting the desired speed for conveyor belts 10a-c at controller 202 or controller 202 is communicably connected by communication link 216 to variable speed drive 212, which is coupled to conveyor belts 10a-c. Variable speed drive 212 controls a plurality of speed drives 110 located in icing coating system 28. Icing coating system includes at least 3 speed drives 110 (shown in FIG. 5A). One speed drive 110 controls the speed of conveyor 10a of in-feed conveyor 58, another speed drive 110 controls the speed of conveyor 10b of icing conveyor 60, and another speed drive 110 controls the speed of conveyor 10c of out-feed conveyor 61. In the exemplary embodiment, the desired speed for conveyor belts 10a-c is between 6.2 FPM and 11.00 FPM, specifically between 6.7 FPM and 10.5 FPM and more specifically, between 7.2 FPM and 10.0 FPM. Once an operator determines desired speed, controller 202 sends a control signal to variable speed drive 212 comprising the desired speed of conveyor belts 10a-c. Variable speed drive 212 then moves conveyor belts 10a-c at the desired speed. In an alternative embodiment, the controller 202 is communicably connected to the speed drives 110, and the variable speed drive 212 is omitted. In this embodiment, the controller 202 controls the speed of each speed drive 110 such that the average speed of conveyor belts 10a-c is the same as when the variable speed drive is employed.

In another embodiment, icing coating system 28 includes a sensor and a second variable speed drive. In this embodiment, the first variable speed drive is connected to the speed drives 110 for the in-feed conveyor 58 and icing conveyor 60, and the second variable speed drive is connected to the speed drive 110 for out-feed conveyor 61. The sensor is supported by the support structure 64 and is located where the pastries 23 transition from icing conveyor 60 to out-feed conveyor 61. Pastries 23 move along conveyor belt 10b in a plurality of rows, with each row having a plurality of pastries aligned perpendicular to the direction 40 of the top portion 52 of conveyor belt 10b. The rows of the plurality pastries 23 enter icing conveyor 60 with the fronts and back of all the pastries 23 in each of the plurality of row aligned together. In some instances, the pastries may become missaligned in the row during the icing process, such that the fronts of some pastries are further along conveyor 10b than other pastries in the same row. Additionally, as the pastries transition from icing conveyor 60 to out-feed conveyor 61, a strings of icing may break off from the pastries 23 and be left dangling off the end of icing conveyor 60. The strings of icing may drop down on to conveyor 10c or create an undesirable tailing effect of the pastries 23 as they drip off the end of icing conveyor 60.

The sensor is electrically coupled to the controller 202 and configured to sense or detect the front end of a pastry 23 that is the forward most pastry 23 in the row passing along icing conveyor 60 just before it transitions to out-feed conveyor 61 and sense or detect the rear of the backmost pastry 23 in the same row. In one embodiment, the sensor is a photo eye sensor. In response to detecting the forward most pastry 23, the sensor generates a first signal and sends that signal back to the controller 202. A second signal is generated in response to detecting the rear of the backmost pastry 23 in the same row. In an alternative embodiment the sensor only detects the front most pastry and the second signal is generated in response to a preprogramed time variable. The preprogramed time variable may be calculated based on a statistical modal of the likely position of the plurality of pastries 23 in a single row after passing through the icing 68. In this instance the second signal may be generated within the controller 202. The controller 202 receives the first signal from the sensor and sends a control signal to the second variable speed drive. The second variable speed drive adjusts the speed of conveyor belt 10c in response to the first signal. Likewise, the controller 202 receives the second signal from the sensor and sends a control signal to the second variable speed drive. The second variable speed drive adjusts the speed of conveyor belt 10c in response to the second signal. Changing the seed of conveyor belt 10c in this manner allows for realignment of the pastries 23. The change in speed also allows for the string of icing left on the end of icing conveyor 60 to drip down directly on top of the pastries 23, thus reducing or eliminating the undesirable tailing effect and the dripping of icing 68 directly on to conveyor 10c. In one embodiment, conveyor belt 10c is stopped in response to the first signal and sped up in response to the second signal, such that the average speed of conveyor belt 10c is equal to the average speed of conveyor belt 10b. In another embodiment, no variable speed drives are used and the controller directly operates the speed drives 110 of the icing conveyor 60 and out-feed conveyor 61 to achieve the same results as above.

Referring to FIG. 6, the flow rate that controls fluid control system includes a temperature sensor 204, sensor pump 214, controllable heat source and controller 202. Controller 202 is coupled to a sensor pump 214 and heat source to control the flow of the sensor pump 214 and the heat source based upon a signal generated by temperature sensor 204 representative of the temperature of icing 68 in the icing coating system 28. The fluid control system may also be controlled by an operator manually setting the desired flow rate of sensor pump 214 being pumped from return hopper 12 to icing pan 70. In the exemplary embodiment icing 68 is pumped at approximately 6.0 gallons per minute. In other embodiments, the flow rate of icing 68 may be more or less than 6.0 gallons per minute. Controller 202 is communicably connected to sensor pump 214 by communication link 216. Once an operator determines desired flow rate, controller 202 sends a control signal to sensor pump 214 indicating the amount of icing 68 to be pumped through conduit 62 from return hopper 12 to icing pan 70.

Referring to FIG. 6, icing 68 layer depths are determined by the speed of conveyor belts 10a-c and the flow rate of sensor pump 214. In one embodiment, controller 202 has pre-set settings for various pre-determined layer depths of icing 68. An operator may select the desired layer depth of icing 68 and controller 202 will send control signals to conveyor belts 10a-c and sensor pump 214 to meet the respective conveyor speed and pump flow rate that produces the desired layer depth of icing 68.

Figure 7:
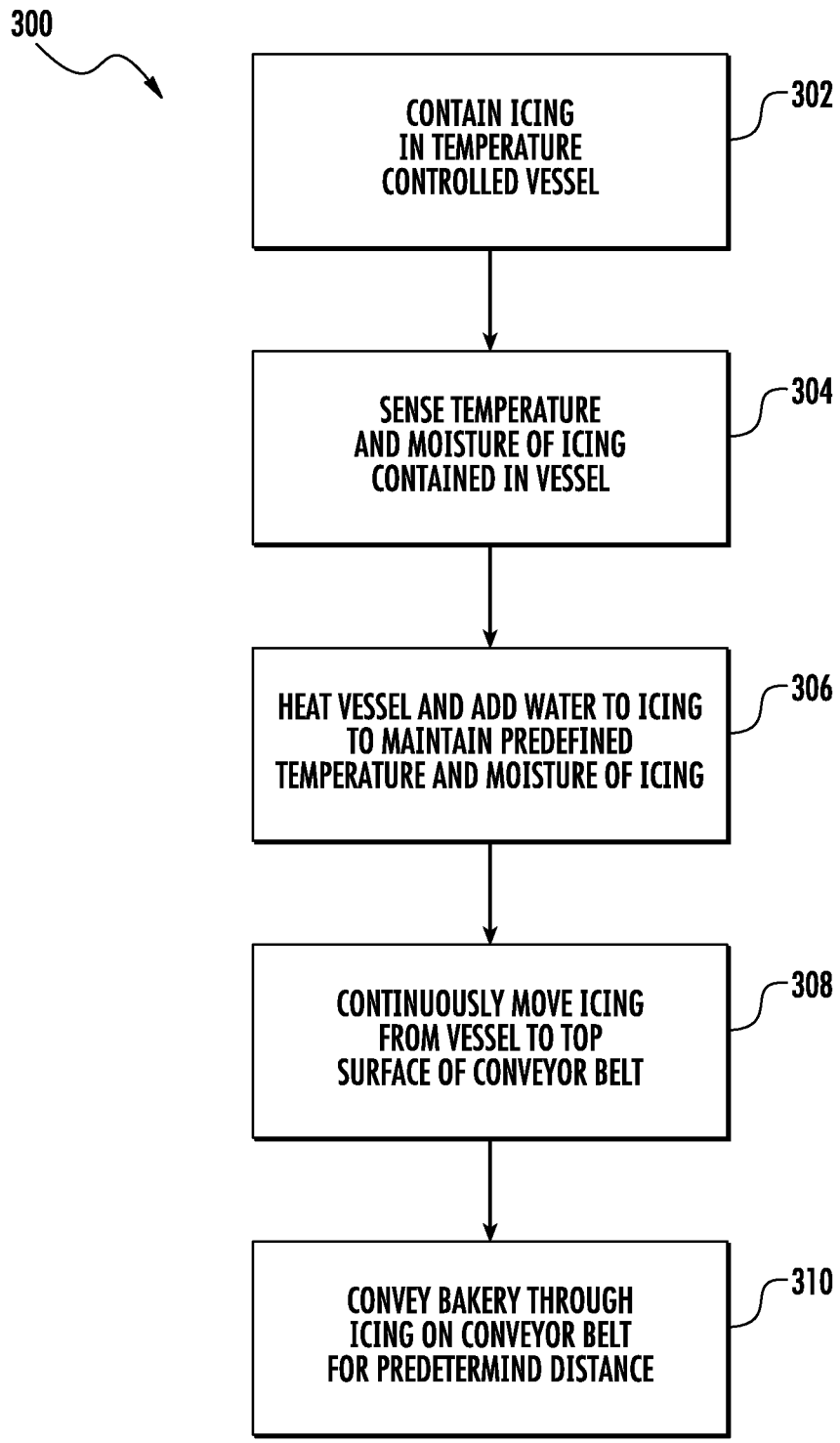
FIG. 7 is a flow-diagram showing a method for icing a pastry with water-based icing according to an exemplary embodiment.

Referring to FIG. 7, a method 300 of preparing bakery such as donuts, cookies, pastries, etc. with icing 68 is shown according to an exemplary embodiment. In one embodiment, method 300 is performed using icing coating system 28 described above. At step 302, icing 68 is loaded into and contained in reservoir 17. Reservoir 17 is a temperature controlled vessel. At step 304, the temperature and moisture level of icing 68 in reservoir 17 is continuously sensed and detected. At step 306, reservoir 17 is heated and water is added in the form of mist, steam or both, to icing 68 to maintain the temperature and moisture level of icing 68 within a predetermined range. At step 308, icing 68 is continuously moved from reservoir 17 to top surface 94 of conveyor belt 10b through openings 102 in conveyor belt 10b. Top surface 94 of conveyor belt 10b supports pastries 23 being conveyed through the layer of icing 68. At step 310, conveyor belt 10b moves pastries 23 through layer of icing 68 on top surface 94 of conveyor belt 10b for a predetermined distance. Method 300 may also include further steps of conveying pastries 23 without icing 68 to in-feed conveyor 58 and conveying pastries 23 with icing 68 away from out-feed conveyor 61. Method 300 may also include a step of forcing pastries 23 into icing 68 on top surface 94 of the conveyor belt 10b by using a roller assembly system.

Figure 9:
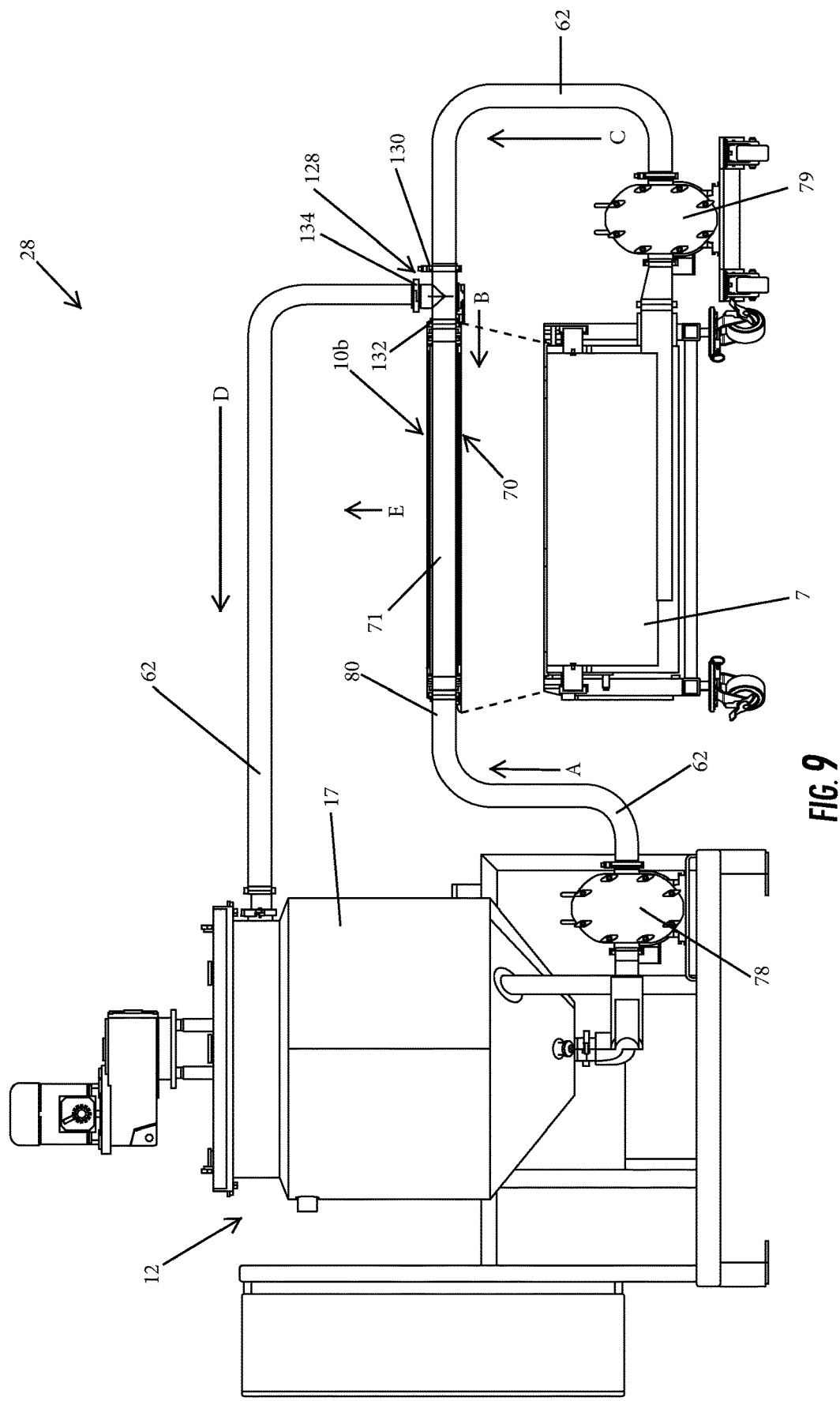
FIG. 9 is a schematic view of an alternative embodiment of the flow path for icing in the system.

FIG. 9 is a schematic view of an alternative embodiment of the flow of icing in icing coating system 28. In this embodiment, icing 68 flowing into icing pan 70 can be sourced from reservoir 17 and/or catch basin 7. In this embodiment, a proportional valve 128 is in fluid communication with second variable icing pump 79, icing pan 70, and reservoir 17 of icing return hopper 12. Proportional valve 128 has an input port 130, a first output port 132, and a second output port 134. The second variable icing pump 79 is in fluid communication with catch basin 7 and input port 130. Second output port 134 is in fluid communication with reservoir 17, and first output port 132 is in fluid communication with icing pan 70. Input port 130 is in fluid communication with first and second output ports 132 and 134. In one embodiment, second output port 134 is coupled to the end of distribution tube 71 opposite pump outlet 80. As in other embodiments described above, first variable icing pump 78 is in fluid communication with reservoir 17 and icing pan 70.

In operation, first variable icing pump 78 pumps icing from reservoir 17 through conduit 62 into icing pan 70 at pump outlet 80 through distribution tube 71. Icing 68 passes through the holes in distribution tube 71 into icing pan 70 and flows in direction 41 up through openings 102 in conveyor belt 10b, where a portion of icing 68 coats pastries 23. Excess icing 68 that is not used to coat pastries 23 is collected in catch basin 7. Second variable icing pump 79 pumps icing 68 from catch basin 7 to input port 130. Icing output from second output port 134 is pumped to reservoir 17 by second variable icing pump 79, and icing output from first output port 132 is pumped into icing pan 70 by second variable icing pump 79. In one embodiment, the total amount of icing 68 output at first output port 132 and second output port 134 is equal to the amount of icing received at input port 130.

The proportional valve 128 is controllable to vary the ratio of the relative flow rates of the icing 68 output from first output port 132 and second output port 134. In this embodiment, the amount of icing 68 output from first output port 132 ranges form 0-100% of the icing 68 received at input port 130, as the ratio of the proportional valve 128 is varied between 0 and 1. A ratio of 1 represents 100% of icing 68 received at input port 130 being output from first output port 132 and a ratio of 0 represents 0% of icing 68 received at input port 130 being output from first output port 132. In an alternative embodiment, proportional valve 128 is flipped such that a ratio of 1 represents 0% of icing 68 received at input port 130 being output from first output port 132 and a ratio of 0 represents 100% of icing 68 received at input port 130 being output from first output port 132. In one embodiment, the amount of icing 68 output from second output port 134 equals the amount of icing received at input port 130 minus the amount of icing 68 output from first output port 132. Other embodiments are contemplated where a portion of icing 68 received at input port 130 is diverted outside the system to be disposed of rather than pumped out from first output port 132 or second output port 134.

During operation of icing coating system 28, the icing 68 is exposed to various stresses as it move through the pumps 78 and 79, flows from reservoir 17 to catch basin 7. These stresses are the result of movement, shear, heat, and/or friction. Over time exposure to these and other stresses breaks down icing 68 to a point where it is no longer suitable for use in coating pastries 23. To more quickly used stressed icing and prevent waste, more of icing 68 may be recycled from catch basin 7 into icing pan 70 as it begins to break down. As icing 68 begins to break down, the thickness of icing 68 increases and it becomes more difficult to pump icing 68 through the system.

Second variable icing pump 79 is configured to generate a first thickness signal representative of the thickness of icing 68. Proportional valve 128 is then controlled to vary the ratio in response to the first thickness signal. This process can be done manually or automatically by use of a control system such as controller 202. Typically, the thickness signal would be based upon the amperage required to power the motor which powers pump 79. This amperage is a relatively reliable indicator of motor torque which is related to the thickness of the material being pumped by the associated pump i.e. pump 79.

In automatic operation, the first thickness signal generated based upon the torque applied to pump 79 is sent to controller 202. Controller 202 controls the ratio of proportional valve 128 in response to the first thickness signal. In one embodiment, controller 202 increases the ratio as the first thickness signal increases relative to previous values of the first thickness signal stored in the controller 202 and decreases the ratio as the first thickness signal decreases relative to previous values of the first thickness signal stored in the controller 202. In this way a greater percentage of icing 68 is recycled from catch basin 7 into icing pan 70 as icing 68 thickens and begins to break down. In another embodiment controller 202 sets the ratio by comparing the received first thickness signal to a database of values stored in controller 202 that indicate a specific ratio to set for a specific thickness signal or range of thickness signals. In another embodiment, first variable icing pump 78 generates a second thickness signal (based upon the amperage required to power the motor powering pump 78) which is sent to controller 202. Controller 202 compares the first thickness signal to the second thickness signal, and increases the ratio when the first thickens signal is greater than the second thickness signal.

In another embodiment, icing coating system 28 includes a coating level sensor (not shown) attached to the catch basin 7. The coating level sensor generates a level signal representative of the level of icing 68 held within catch basin 7. In one embodiment the level signal is sent to controller 202. Controller 202 controls the flow rates A and C of variable icing pumps 78 and 79 respectively and the ratio in response to the level signal. For example, if the level signal indicates the level of icing 68 within catch basin 7 is low, controller 202 will increase the amount of icing 68 flowing into icing pan 70 by increasing flow rate A to draw more icing 68 from reservoir 17 and/or increase the ratio to recirculate more icing 68 from catch basin 7 into icing pan 70.

In another embodiment, icing coating system 28 includes a coating signal generator (not shown), which generates a coating signal representative of the desired coating level of pastries 23. The coating signal generator passes the coating signal to the controller 202, which will adjust the flow rate of first variable icing pump 78, the flow rate of second variable icing pump 79, and/or the ratio of proportional valve 128 as necessary to achieve the desired coating level.

In one embodiment, the time it takes for icing 68 to be drained first from catch basin 7 or reservoir 17 is dependent on the various flow rates of icing within the system. As described above, the flow rates A and C for first and second variable icing pumps 78 and 79 respectively are independently controllable either manually or by controller 202. The flow rates B and D from first and second output ports 132 and 134 respectively are dependent on the flow rate C of second variable icing pump 79 and the selected ratio of proportional valve 128. Flow rates B and D may be expressed in terms of flow rate C and the ratio of proportional valve 128. Flow rate B equals the ratio times flow rate C and flow rate D equals flow rate C time the result of 1 minus the ratio. In an alternative embodiment, the proportional valve 128 is flipped such that the Flow rate D equals the ratio times flow rate C and flow rate B equals flow rate C time the result of 1 minus the ratio. The flow rate E of icing 68 that coats pastries 23 is independent and may be varied by changing the speed of conveyor belt 10b. The time until reservoir 17 is drained of icing 68 is determined by subtracting flow rate D from flow rate A and dividing the result by the volume of icing in reservoir 17. The time until catch basin 7 is drained is determined by adding together the flow rates E and C, subtracting off flow rates A and B and dividing the result by the volume of icing 68 in catch basin 7.

In one embodiment, where flow rate D is equal to flow rate C times 1 minus the ratio, five options are contemplated for varying the independent flow rates A, C, and E to vary whether icing 68 is drained from reservoir 17 or catch basin 7. First, icing 68 will drain from reservoir 17 and hold at a constant volume in catch basin 7 so long as flow rate A is equal to flow rate E plus the result of flow rate C times 1 minus the ratio. Second, icing 68 will drain from catch basin 7 and hold at a constant volume in reservoir 17 so long as flow rate A is equal to flow rate C times 1 minus the ratio. Third, icing 68 will drain from catch basin 7 and increase in volume in reservoir 17 so long as flow rate A is less than flow rate C times 1 minus the ratio. This situation may result in overflowing reservoir 17 if the total volume of icing 68 not used to coat pastries 23 cannot be held in reservoir 17. Fourth, catch basin 7 and reservoir 17 will begin to slowly lose icing 68 so long as flow rate A is greater than flow rate C times 1 minus the ratio but less than flow rate E plus the result of flow rate C times 1 minus the ratio. In this situation, the first vessel to be drained will depend on the volume of icing 68 in each vessel, and can be calculated according to the formulas recited above. Finally, icing 68 will drain from reservoir 17 and increase in volume in catch basin 7 so long as flow rate A is greater than flow rate E plus the product of flow rate C times 1 minus the ratio. This situation may result in overflowing catch basin 7 if the total volume of icing 68 not used to coat pastries 23 cannot be held in catch basin 7.

In one embodiment, controller 202 is configured to adjust the independent flow rates A, C, and E, and the ratio to run the system according to one of the five options described above. In one embodiment, controller 202 runs a specific option manually selected by a user. In another embodiment, controller 202 selects the option based on signals received from the system including the first and second thickness signals, the level signal, and/or the coating signal.

As can be appreciated, it is contemplated that the control schemes discussed above are examples of control arrangements configured to selectively source the icing 68 flowing into icing pan 70 from reservoir 17 and catch basin 7 to improve the coating (e.g. icing or frosting) quality during the associated coating process. Accordingly, various combinations of controlling the pumps and valve, alone or in combination, may be utilize depending upon a particular coating application, cost considerations, cost-effective availability of relevant signals (e.g. thickness, level signal, coating signal, moisture signal, etc.), system speed, coated product quality requirements, etc.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications.

Any of the features, elements, or components of any of the exemplary embodiments discussed above may be used alone or in combination with any of the features, elements, or components of any of the other embodiments discussed above. The embodiments of the present invention are discussed as being usable with icing such as water-based icing. Depending upon the application, the icing may be a ready to use icing, an icing wherein all or a portion of the water is replaced with a fat, or a water based icing where a both water and fat are present in the icing. Additionally, this application uses the term icing, but it should be understood that depending upon the viscosity and composition, icing may be referred to as frosting or visa versa.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A method for coating a plurality of items with a coating, each item having a first side and a second side, comprising the steps of:
    placing the plurality of items on a first belt including openings through which the coating can flow;
    moveably supporting the first belt such that a top portion of the first belt moves in a first direction, the top portion of the first belt transitions to a bottom portion of the first belt at a first end and the bottom portion moves in a second direction opposite the first direction to a second end, the top portion supporting and conveying a plurality of rows of the plurality of items between the first and second ends in the first direction wherein the plurality of items are supported on the first side;
    controllably moving the top portion in the first direction at an average speed;
    pumping the coating into a pan located between the top and bottom portions of the first belt and through the openings to coat the first side of the plurality of items with the coating as the plurality of items move above the pan;
    moveably supporting a second belt such that a top portion of the second belt moves in the first direction such that the plurality of items are dropped from the second end of the first belt onto the top portion of the second belt;
    sensing the plurality of rows of the plurality of items passing along the first belt at the first end; and
    varying the speed of the second belt when the plurality of rows of the plurality of items are sensed, such that the second belt moves at a drop speed which is below the average speed of the top portion of the first belt when the plurality of items are dropped onto the second belt.

2. The method of claim 1, wherein the drop speed is zero.

3. The method of claim 1, wherein the coating is heated.

4. The method of claim 1, further comprising sensing a moisture content of the coating with a senor, and controllably adding water to the coating with a water injector to maintain the moisture content of the coating.

5. The method of claim 1, wherein the first belt is fabricated from stainless steel to form a mesh defining the openings through which the coating can flow.

6. The method of claim 1, further comprising regulating a coating temperature with a temperature regulated reservoir for the coating and comprising a heat exchanger in thermal communication with the reservoir.

7. The method of claim 6, further comprising pumping a fluid at a predefined temperature through the heat exchanger to regulate the temperature of the coating and reduce evaporation of moisture within the coating.

8. The method of claim 7, wherein the temperature of the coating in the reservoir is maintained between 120° and 130° degrees Fahrenheit.

* * * * *